(12) United States Patent
Pelletier et al.

(10) Patent No.: US 8,087,797 B2
(45) Date of Patent: Jan. 3, 2012

(54) ILLUMINATION DEVICE WITH DETACHABLE LIGHT SOURCES

(75) Inventors: Thomas Pelletier, Wallingford, CT (US); Brian McNeill, Avon, CT (US); Robert St. John, Cheshire, CT (US); Joshua Brown, Beacon Falls, CT (US); David Ross, Orange, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 640 days.

(21) Appl. No.: 12/204,171

(22) Filed: Sep. 4, 2008

(65) Prior Publication Data

US 2010/0039801 A1 Feb. 18, 2010

Related U.S. Application Data

(60) Provisional application No. 61/081,889, filed on Jul. 18, 2008.

(51) Int. Cl.
*F21L 4/04* (2006.01)
(52) U.S. Cl. ........ 362/205; 362/199; 362/198; 362/227; 362/190; 362/191
(58) Field of Classification Search ............... 362/199, 362/208, 227, 372, 374, 109, 116, 157, 190, 362/191, 362, 394, 184, 197
See application file for complete search history.

(56) References Cited

U.S. PATENT DOCUMENTS

| | | |
|---|---|---|
| 1,875,956 A | 9/1932 | Thiel |
| 4,208,703 A | 6/1980 | Orr |
| 4,791,538 A | 12/1988 | Prest |
| 5,541,822 A | 7/1996 | Bamber |
| 5,630,660 A | 5/1997 | Chen |
| 5,684,452 A | 11/1997 | Wang |

(Continued)

FOREIGN PATENT DOCUMENTS

CN 200993315 Y 12/2007

(Continued)

OTHER PUBLICATIONS

Reston Condit, "World's smallest microcontroller promotes non-traditional usage," Embedded Computing Design, Winter 2004, 4 pp.

(Continued)

*Primary Examiner* — Anabel Ton
(74) *Attorney, Agent, or Firm* — Pillsbury Winthrop Shaw Pittman LLP

(57) ABSTRACT

An illumination device includes independent light sources and pivotable legs. In an embodiment, each independent light source includes a head having an illumination element; a body; a power source holder configured to receive a power source for powering the illumination element; a switch configured to control the independent light source; and an electrical circuit configured to place the independent light source and at least one other independent light source in an electrically coupled state. The switch may be configured to control an illumination state of both the independent light source and the at least one other independent light source when in the electrically coupled state. The illumination provided by the illumination device may be adjusted to different angles with respect to a longitudinal axis of the illumination device by rotating each of the plurality of pivotable heads. The pivotable legs are movable between a retracted configuration and an expanded configuration.

44 Claims, 18 Drawing Sheets

U.S. PATENT DOCUMENTS

| | | | |
|---|---|---|---|
| 5,853,241 | A | 12/1998 | Sharrah et al. |
| 6,259,373 | B1 | 7/2001 | Ghahramani |
| 6,265,969 | B1 | 7/2001 | Shih |
| 6,394,631 | B1 | 5/2002 | Yuen |
| 6,669,353 | B2 | 12/2003 | Kung |
| 6,899,441 | B2 | 5/2005 | Chen |
| 7,011,423 | B2 | 3/2006 | Chen |
| 7,063,444 | B2 | 6/2006 | Lee et al. |
| 7,097,322 | B2 | 8/2006 | Shuniak |
| 7,269,909 | B1 | 9/2007 | Barbieri |
| 2002/0136005 | A1 | 9/2002 | Lee |
| 2005/0152137 | A1 | 7/2005 | Opolka |
| 2006/0082321 | A1 | 4/2006 | Van Deursen et al. |
| 2006/0175977 | A1 | 8/2006 | Deursen et al. |
| 2006/0181865 | A1 | 8/2006 | Van Deursen et al. |
| 2008/0030977 | A1 | 2/2008 | Bobbin et al. |
| 2009/0135611 | A1* | 5/2009 | Lin .............................. 362/372 |

FOREIGN PATENT DOCUMENTS

| | | |
|---|---|---|
| FR | 1347134 A | 12/1963 |
| GB | 794452 A | 5/1958 |
| WO | 99/20935 | 4/1999 |

OTHER PUBLICATIONS

Extended Search Report and Written Opinion issued for European Patent Application No. 08167556.3, dated Jun. 2, 2009.

First Examination Report as issued for Australian Patent Application No. 2009202777, dated Sep. 7, 2009.

Second Examination Report as issued for Australian Patent Application No. 2009202777, dated Dec. 21, 2010.

* cited by examiner

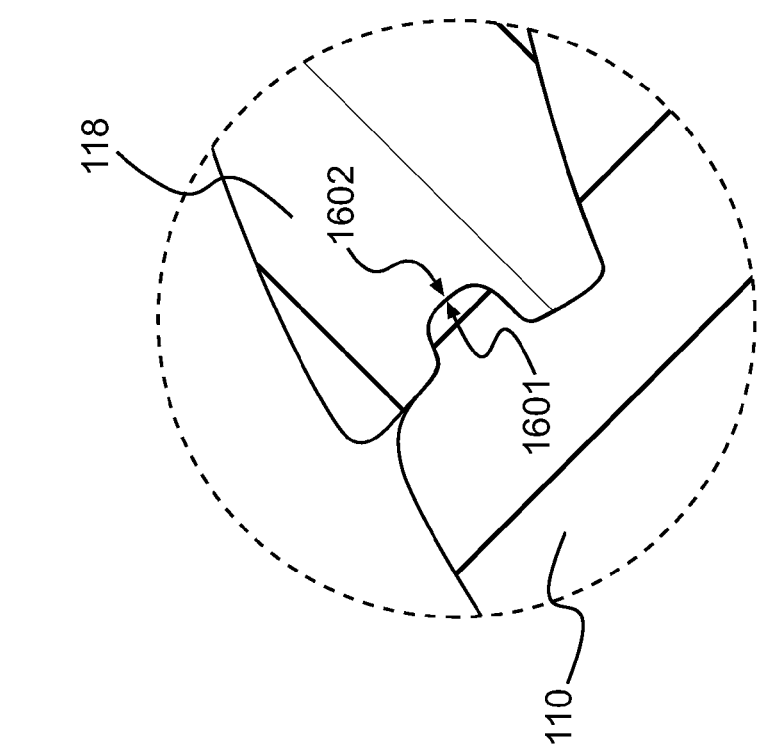
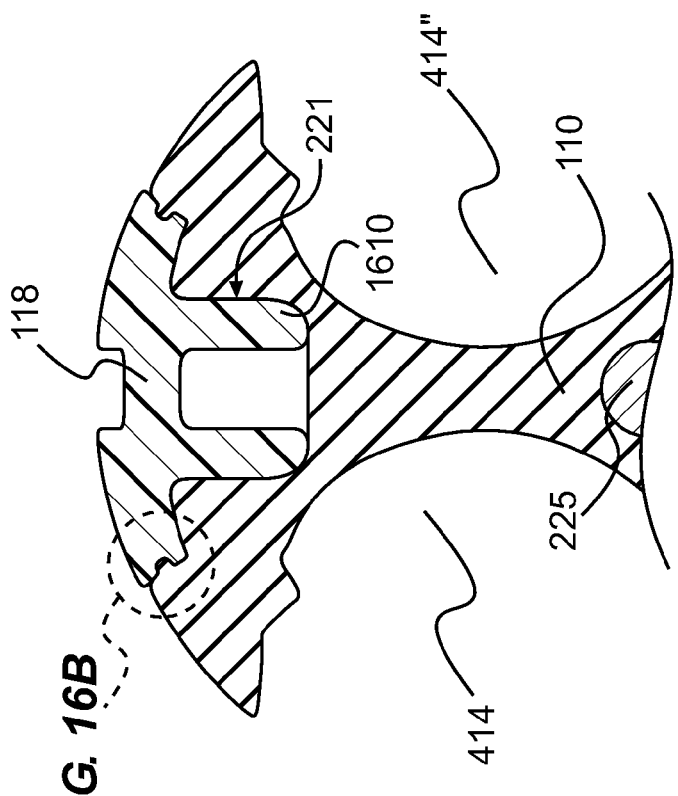
FIG. 16B
FIG. 16A

ILLUMINATION DEVICE WITH DETACHABLE LIGHT SOURCES

CROSS REFERENCE TO RELATED APPLICATIONS

This application claims benefit under 35 U.S.C. §119(e) to U.S. Provisional Patent Application Ser. No. 61/081,889, filed Jul. 18, 2008, the entire contents of which are incorporated herein by reference.

BACKGROUND

Conventional illumination devices, e.g. flashlights, have been known for many years. There is a demand for illumination devices that are more versatile than conventional flashlights to enable enhanced functionality. Various embodiments of unique illumination devices are described in the present disclosure.

SUMMARY

According to various aspects of this disclosure, an illumination device may be configured to be free standing, for example, as a free standing work light. The illumination device may include a plurality of illumination elements for generating light. One or more illumination elements may be located in a head unit, and each head unit of a plurality of head units may be individually directed to illuminate a different portion of a work area. The illumination device may include a base having a plurality of retractable legs that form a stable and sturdy platform from which the illumination elements may be directed.

In one embodiment, each head unit may be provided as a portion of a detachable and independent light source which may be configured to be separable from the base. Each independent light source may be configured as a handheld light so that, upon removal from the base, the light source may be used, for example, as a flashlight. Furthermore, the entire illumination device, including the base and any installed light sources, may be configured as a handheld light source, for example, by retracting into the base the legs provided thereon.

In other aspects of this disclosure, each detachable light source may include an ON/OFF switch, and a power source compartment containing, for example, one or more conventional batteries, rechargeable batteries, and/or other energy storage elements, e.g., one or more capacitors. An electrical circuit may be provided to synchronize the operation of one or more of the light sources. For example, when several detachable light sources are installed in the base, operation of the ON/OFF switch of any of the installed light sources may turn on and turn off all of the light sources installed in the base substantially simultaneously. When the light sources installed in the base are OFF and a light source which is ON is installed in the base, all of the installed light sources may be configured to turn ON. When the light sources installed in the base are ON, a light source that is installed in the base or removed from the base may be configured to turn ON or remain ON. It is recognized that other control patterns for operation of the light sources may be provided, for example, by the use of a programmable controller.

According to an embodiment of this disclosure, an illumination device includes a plurality of independent light sources capable of being electrically coupled to each other. Each independent light source includes a body, a head having an illumination element, a power source holder configured to receive a power source for powering the illumination element, and a switch configured to selectively apply power to the illumination element; wherein at least one of the switches is arranged so as to commonly control each of the plurality of independent light sources when said plurality of independent light sources are electrically coupled.

According to another embodiment of this disclosure, an independent light source for an illumination device includes a body; a head having an illumination element; a power source holder configured to receive a power source for powering the illumination element; a switch configured to turn on and turn off the independent light source; and an electrical circuit configured to place the independent light source and at least one other independent light source in an electrically coupled state, wherein the switch is configured to control an illumination state of both the independent light source and at least one other independent light source when in the electrically coupled state.

According to another embodiment, an illumination device includes a plurality of pivotable heads, wherein each pivotable head comprises an illumination element; a plurality of pivotable legs, wherein each pivotable leg is movable between a handheld flashlight arrangement wherein the legs are generally disposed adjacent one another along the length thereof to enable the legs to be grasped as a flashlight handle and an expanded arrangement in which the pivotable legs extend away from one another to provide spaced support legs configured to support the plurality of pivotable heads in an upright position, wherein each pivotable head is adjustable to different angles with respect to a longitudinal axis of the illumination device; and a switch configured to control the application of power to at least one of the illumination elements.

According to another embodiment, an electrical circuit for an illumination device may include at least one electrical contact configured to electrically couple a plurality of independent light sources. A controller may be configured to detect and/or control the illumination state of at least one of the plurality of independent light sources, wherein a plurality of coupled independent light sources are turned ON or turned OFF in synchronization with the turning ON or turning OFF, respectively, of one of the plurality of coupled independent light sources.

In various aspects of this disclosure, each independent light source may be configured to be detachable from a base. The base may further include a plurality of retractable legs configured to extend from the base to support the base in a vertical orientation. The head of each independent light source may be configured to be rotatable between angles at which the head is substantially inline with the body of the light source and angles at which the head is greater than 90° from being substantially inline with the body of the light source. For example, the head of each independent light source may be configured to rotate, e.g., between being substantially inline with the body of the light source and substantially perpendicular to the body of the light source.

In various other aspects of this disclosure, an electrical circuit may be further configured to detect and/or control an illumination state of the independent light sources installed in the base. A switch of each independent light source may be configured to turn ON and to turn OFF the independent light source when the independent light source is detached from the base. In one aspect, the independent light source may turn ON or remain ON when installed in the base if another independent light source installed in the base is ON. Further, any independent light sources installed in the base may turn ON or remain ON when an independent light source is ON and is installed in the base. The base and each independent light source may further include electrical contacts configured to electrically connect the base and at least one independent light source installed therein. The illumination element may include, e.g., a light emitting diode (LED), an incandescent bulb, a florescent bulb, or combinations thereof. The base may further include a handgrip, and the base may be configured to communicate a signal between the base and at least one independent light source installed in the base. The signal may indicate an illumination state of an installed light source, or may provide a command for controlling the illumination state of an installed light source, for example.

These and other objects, features, and advantages of the inventive concept will be apparent from the disclosure. It is to be understood that the summary, detailed description, and drawings are not restrictive of the scope of the claimed invention.

DESCRIPTION OF THE DRAWINGS

Embodiments of this disclosure are described, by way of example, with reference to the accompanying drawings, in which:

FIG. 16A shows a cross section of a base in which the leg retainer is configured with an interference fit between the legs and the base;

FIG. 16B shows a larger view of the interference fit between a leg and a base.

DETAILED DESCRIPTION

Figure 1:
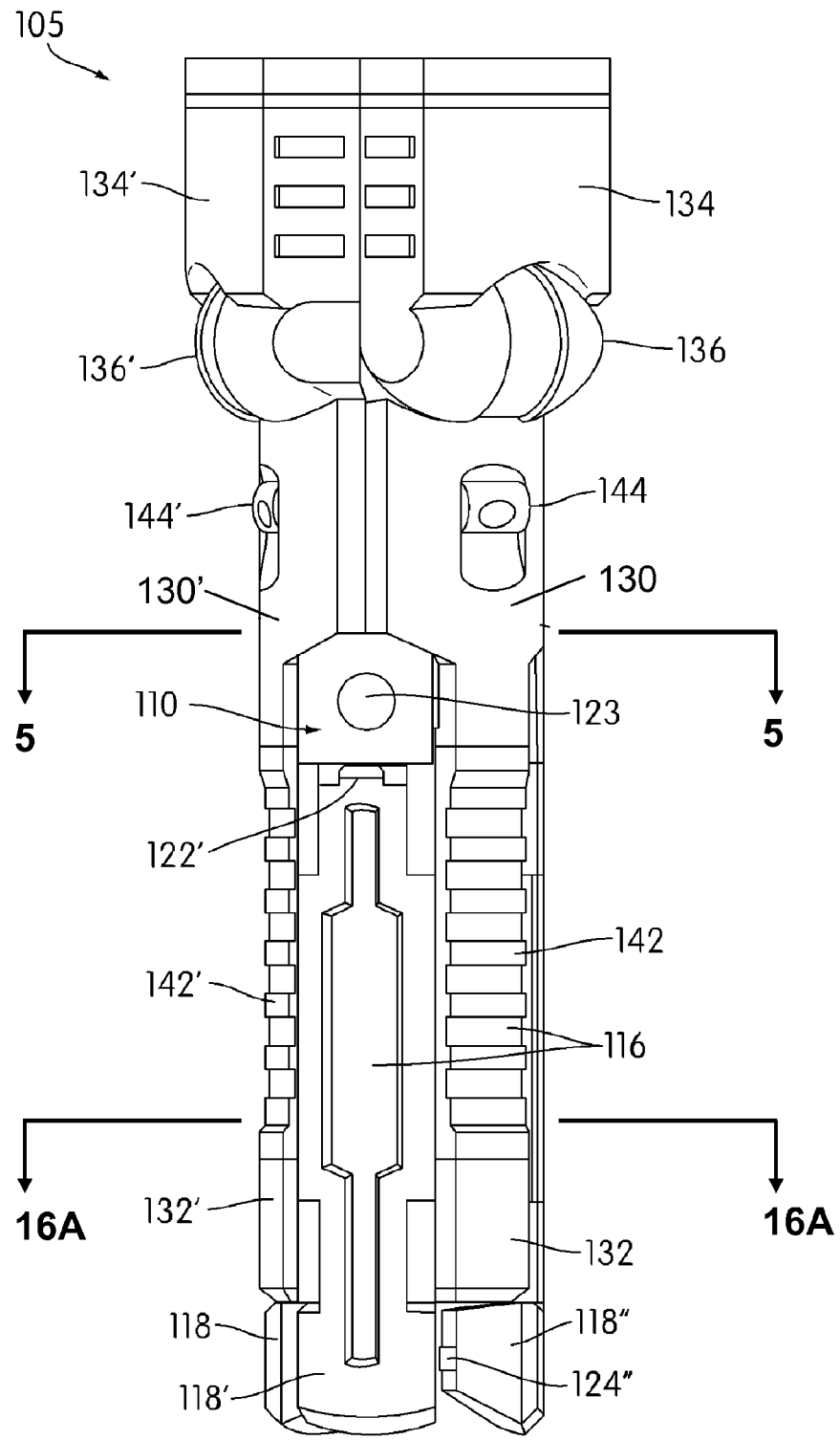
FIG. 1 is a side elevation view of an illumination device having an expandable base and multiple independent and detachable light sources according to an embodiment.

FIG. 1 shows, according to one embodiment of this specification, an illumination device 105 having a base 110 and a plurality of light sources 130, 130', 130". It should be noted that the use of prime and double prime notation with single and double quote marks (' and ") in the disclosure is intended to convey similar elements and to simplify the discussion herein. It should be appreciated that any discussion referring to one light source 130 or any component thereof can apply equally to the light sources 130' and 130" and the component thereof. The base releasably retains or clamps each of the light sources 130, 130' and 130" to one another so that the light sources together form an integrated flashlight. In addition, each of the light sources 130, 130', and 130" in this embodiment can be separable from the others and operate independently from base 110. In one embodiment, base 110 may be provided with a plurality of extendable legs 118, 118', 118" for supporting the base 110, and light sources 130, 130', 130" installed in the base 110, in a generally upright orientation (e.g., see FIG. 2). A leg retainer (further illustrated in an exemplary embodiment of FIG. 2) may be provided to retain legs 118, 118' and 118" in a retracted configuration against base 110. In one embodiment, the leg retainer may include magnetic material 124, 124', 124" for retaining legs 118, 118', 118" (e.g., a magnet or a ferromagnetic material) and a release button 123 for releasing legs 118, 118', 118".

The leg retainer may be implemented by a spring arrangement or by a detent arrangement. Handgrip 116 may be formed when the illumination device 105 is configured (as shown) in a non-expanded arrangement in which the legs 118, 118', 118" are retracted into or against (i.e., folded or pivoted) the body of base 110. Individual light source handgrips 142, 142', 142" (which can optionally be made from an elastomeric or rubber material) may be arranged to cooperate with base 110 (e.g., legs 118 thereof) to form overall handgrip 116 for illumination device 105.

Figure 2:
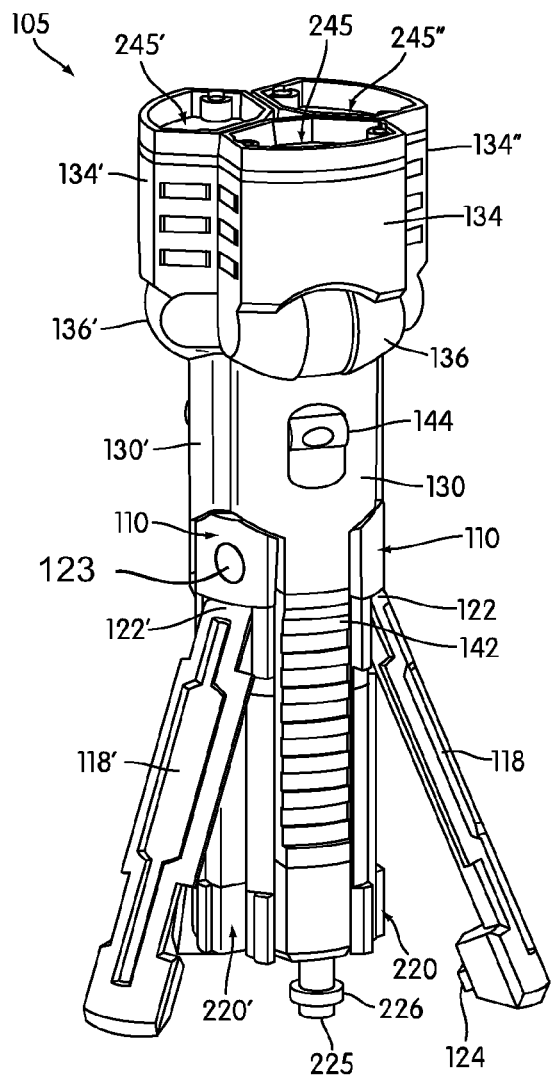
FIG. 2 is a perspective view of the illumination device with illumination elements thereof oriented along the longitudinal axis of the illumination device, and with the base expanded according to an embodiment.

As shown in both FIGS. 1 and 2, when clamped together, each light source 130, 130', 130" may be oriented to have a generally common axis of illumination (e.g., parallel along the longitudinal axis of the device 105 when the light sources are connected with base 110) so as to function as a flashlight with maximum illumination in one general direction (e.g., in the orientation of FIG. 1). In one embodiment, the light sources 130, 130', 130" may be provided with pivotal heads 134, 134' and 134", respectively to enable light to be generated in a variety of directions. In such an embodiment, pivot 136 may be provided between a body (or handle region) 132 and the head 134 of light source 130. The same arrangement can be provided for each light source. The head 134 carries therein a transparent window or lens 245, and at least one illumination element 243 (shown in FIGS. 3A and 3B), such as a conventional flashlight bulb or an LED, configured to be electrically operable by a power source 251 (e.g., a battery) carried within the body 132. The head 134 may be moved with respect to body 132 by rotating head 134 about a pivot axis defined by pivot or hinge 136. As a result, it is possible to direct light from each light source 130, 130', 130" in a desired direction.

Figure 10:
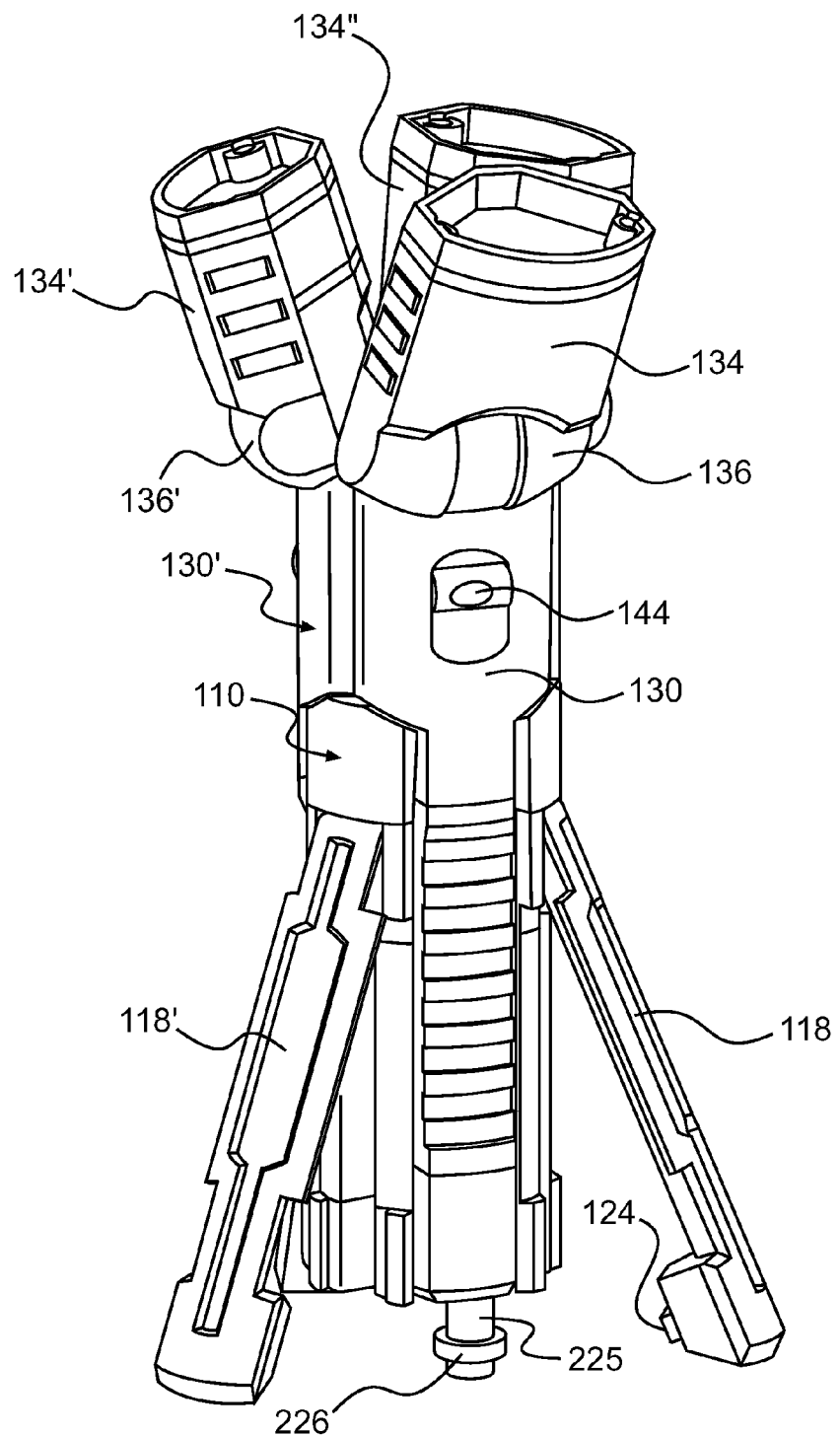
FIG. 10 shows an embodiment of an illumination device arranged as a free standing work light.
Figure 15:
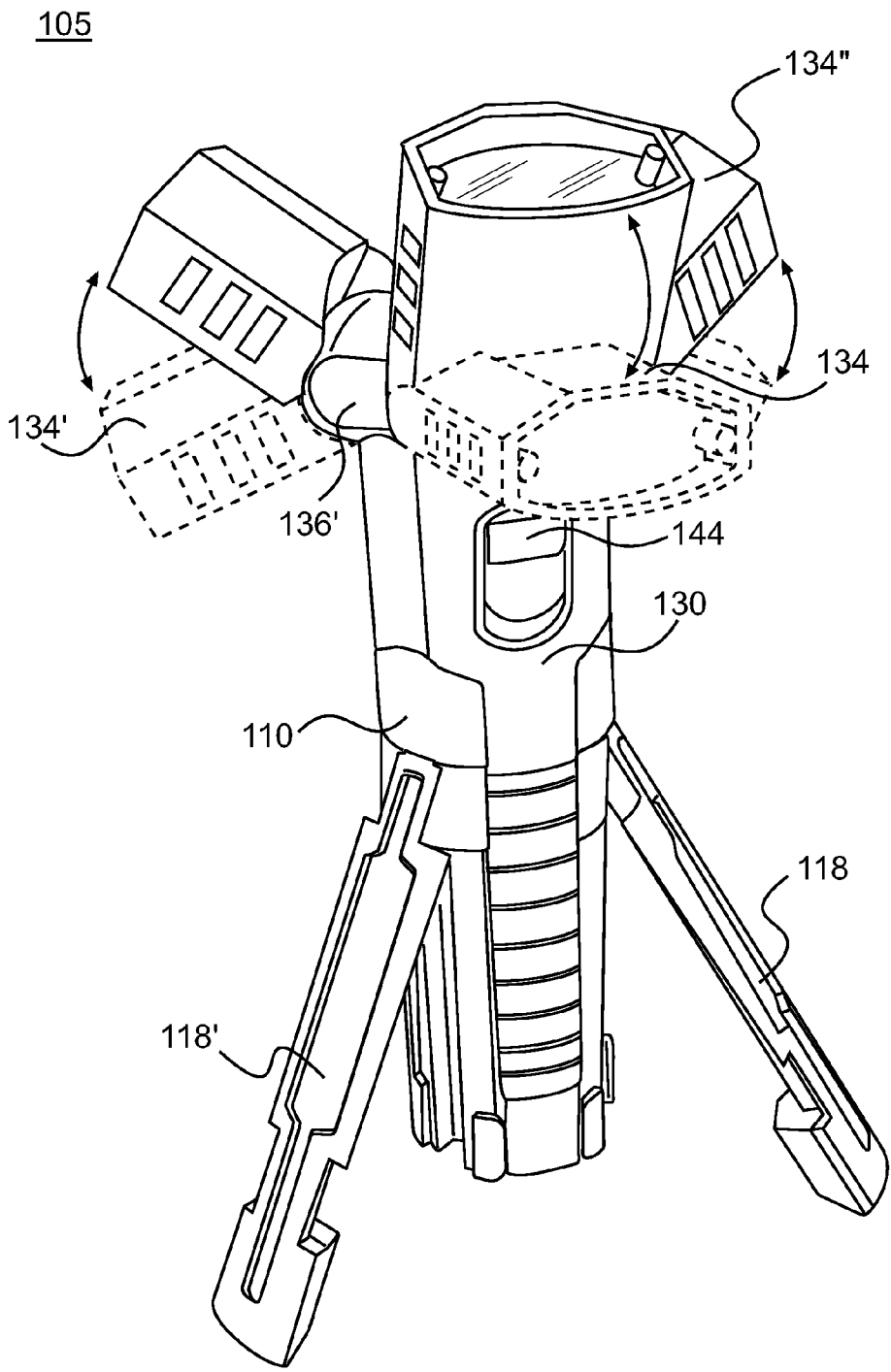
FIG. 15 shows an embodiment of an illumination device arranged with the legs deployed and with adjustable lights.

The pivoting of the head 134 can be accomplished, in an embodiment, when the light sources 130, 130', 130" are coupled to one another or when they are separated. The heads 134 may be configured to provide strong illumination in the direction of the base axis so as to provide illumination in a generally uniform direction (i.e., like a flashlight), as shown in FIG. 1. In addition, it is possible to direct head 134 of each light source 130 to illuminate a plurality of different portions of a work area, for example, when the illumination device 105 is configured as a free standing work light (e.g., as shown in FIGS. 10 and 15).

An ON/OFF switch 144, 144', 144" may be provided for each light source 130, 130', 130", respectively. If one of the light sources 130, 130', 130" is removed from base 110, it can be turned ON and turned OFF by actuating the associated ON/OFF switch 144, 144', 144", respectively. In addition, the illumination device 105 may be configured such that all of the light sources 130, 130', 130" if installed in base 110 can be turned ON and OFF in synchronization with the operation of any of the ON/OFF switches 144, 144', 144". In another embodiment, each of the light sources can be independently controlled by the associated switch, even when the light sources are installed in base 110. In another embodiment, a mode selector switch (not shown) interfacing with a power control circuit (e.g., see FIG. 7A) can be provided to allow each light source to be optionally controlled independently or together when they are connected with the base 110.

FIG. 2 shows the illumination device 105 configured, for example, as a free standing work light. When illumination device 105 is in the expanded configuration as shown, legs 118, 118', 118" are extended outward from base 110. When three legs are provided, for example, the plurality of legs 118, 118', 118" form a tripod capable of supporting the illumination device 105 in a substantially vertical orientation. Upon this platform, heads 134, 134', 134" of each light source 130, 130', 130" installed in base 110 may be rotated about pivots 136, 136', 136" in order to illuminate different portions of a work area.

The plurality of legs 118, 118', 118" may be configured to rotate about associated hinges 122, 122', 122", respectively, which are mounted on base 110. Legs 118 may be configured to be substantially flush with the profile of handgrip 116 of base 110 when legs 118, 118', 118" are retracted or folded into recesses 220, 220', 220", respectively, in the base 110. Handgrip 116 may have an ergonomic profile which may be, for example, generally cylindrical when legs 118, 118', 118" are retracted. In one embodiment, the legs may have an elastomeric outer surface to enhance gripping thereof and may be considered to form part of handgrip 116. Accordingly, the illumination device 105 may be comfortably held by hand, for example, as a flashlight.

A leg retainer may include release button 123, activation rod 225, magnetic material 226, and magnetic materials 124, 124', 124" provided on each leg 118, 118' and 118", respectively, to releasably retain legs 118, 118', 118" within respective recesses 221, 221', 221" in similar fashion to what is described in U.S. Pat. Nos. 7,342,360, 7,269,909, and 7,364,320, the entire contents of which are incorporated herein by reference. The illumination device 105 may be converted from the retracted configuration into the expanded configuration, for example, by depressing release button 123. Release button 123 may be spring-loaded to remain in an unactivated state, and connected by a mechanical linkage (not shown) to activation rod 225. Activation rod 225 may be configured to extend vertically lengthwise through the center of base 110 and may be slidably mounted, thus enabling activation rod 225 to move longitudinally relative to base 110.

In an embodiment, activation rod 225 can be spring biased in an upward direction (relative to FIG. 2) when activation button 123 is not depressed. The depression of release button 123 can displace activation rod 225 downwards into an activated state.

Figure 13:
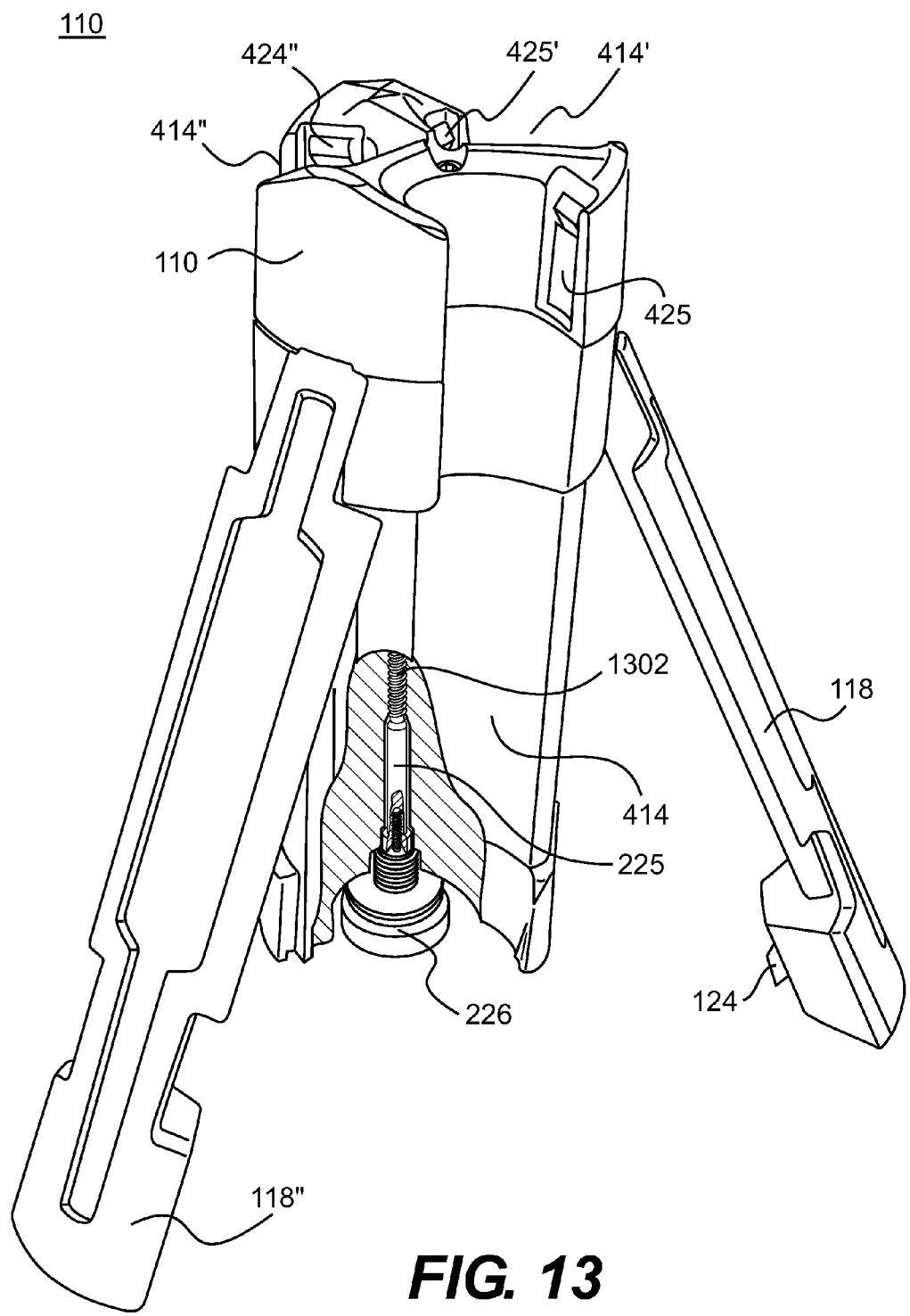
FIG. 13 shows a cut-away view of an embodiment of a base.

In another embodiment, the leg retainer can be configured without a release button (as shown in FIG. 13). Spring 1302 may be provided between activation rod 225 and base 110. Spring 1302 can bias activation rod 225 in an downward direction (relative to FIG. 13) in an unactivated state. Activation rod 225 can be slidably displaced in an upward direction into an activated state, e.g., by a user pressing a distal end of activation rod 225.

When activation rod 225 is in the unactivated state, legs 118, 118', and 118" can be retained in the retracted configuration, for example, by magnetic force. In particular, a magnetic material 226 may be provided on a distal end of activation rod 225, and additional magnetic material 124, 124', 124" may be provided on inward sides of legs 118, 118', 118". The magnetic materials 124, 124', 124" and 226 are configured to attract one another (e.g., they can be a pair of magnets having opposite polarities, or a ferromagnetic metal and a magnet). Magnetic materials 124 and 226 are aligned adjacent to one another and magnetic force retains legs 118 if activation rod 225 is not activated, thus legs 118, 118', 118" can be retained in a retracted configuration (as shown in FIG. 1). Legs 118, 118', 118" may be extended from base 110 by lessening or releasing the magnetic force of attraction, for example, by displacing activation rod 225 so that magnetic material 226 is out of contact with material 124, 124', 124".

In a further embodiment, magnetic material 226 can be fixed with respect to base 110 and the legs 118, 118', 118" can be manually pulled away from the magnetic material 226. —Therefore, a movable activation rod 225 and/or release button 123 would not be necessary.

Figure 11:
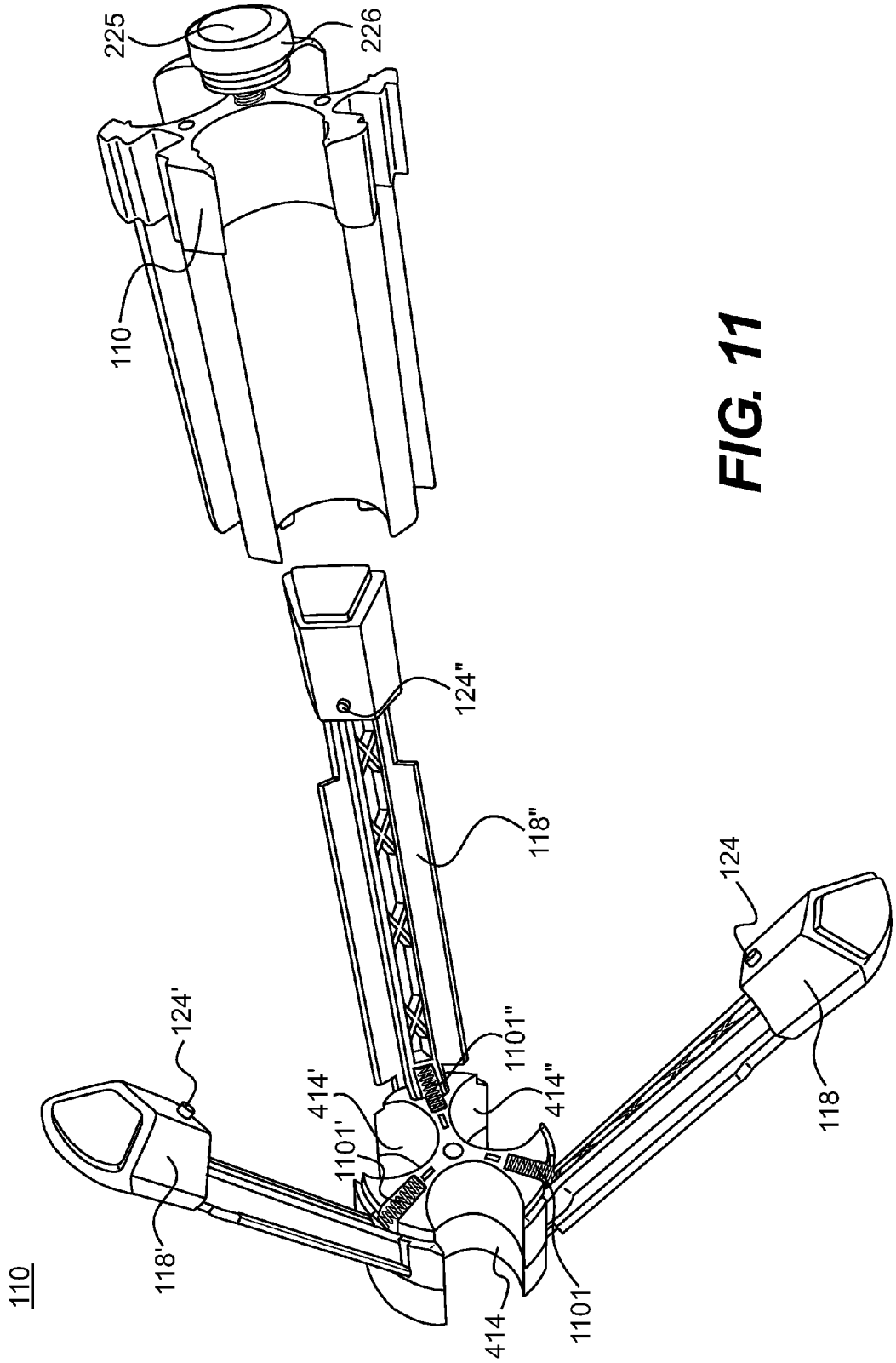
FIG. 11 shows an exploded view of an embodiment of a base spring-biased in the expanded configuration.
Figure 12:
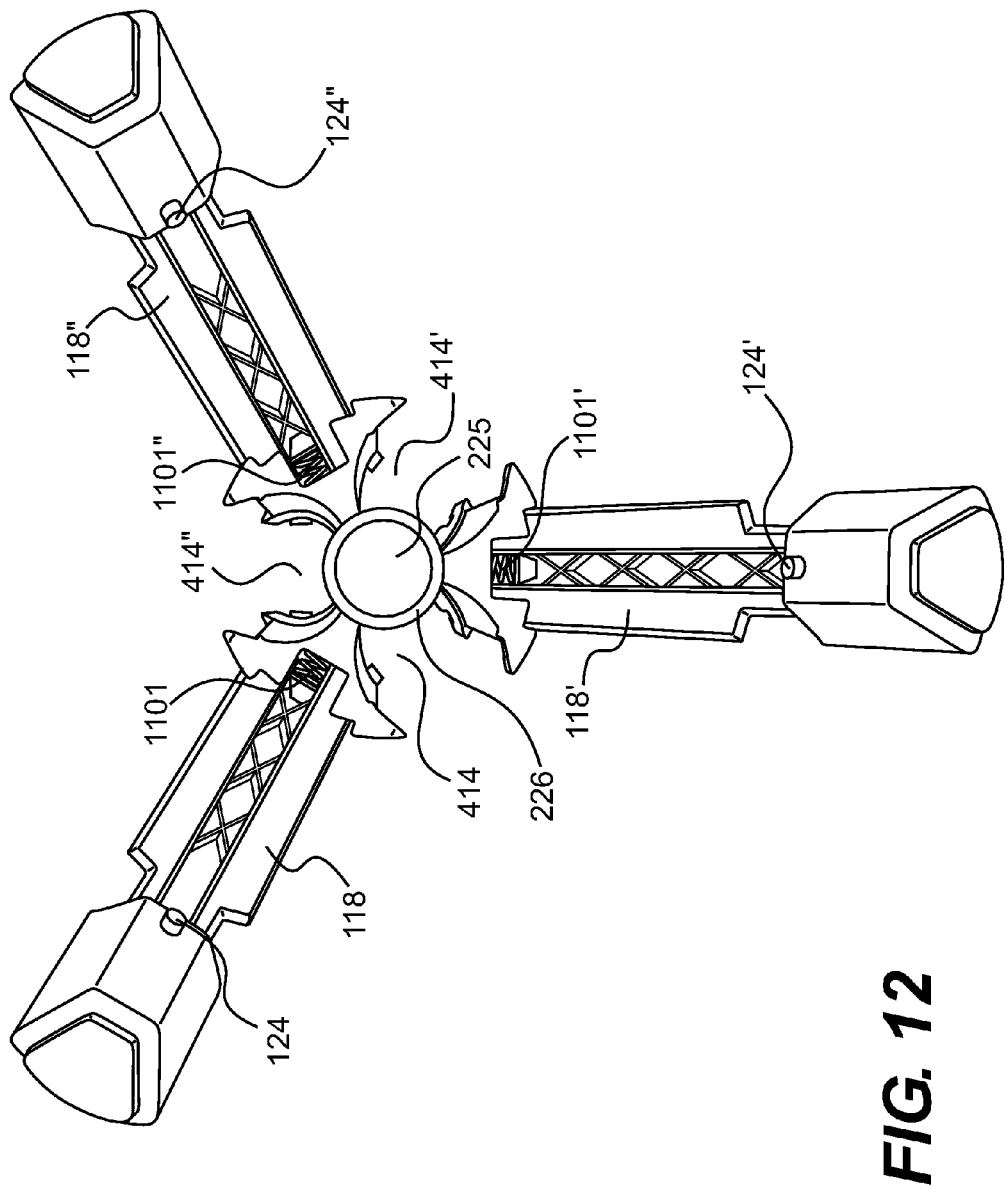
FIG. 12 shows a bottom view of an embodiment of a base spring-biased in the expanded configuration.

In one embodiment, legs 118, 118' and 118" are spring loaded by springs 1101, 1101', and 1101" (as shown in FIGS. 11 and 12) so that upon activation of activation rod 225, legs 118, 118', 118" spring outwardly into the tripod configuration. To return the legs, they can be manually moved towards the base 110, and back into its locked configuration. In other embodiments, legs 118, 118', 118" may be manually moveable into or out of the deployed configuration, e.g., a tripod configuration.

In a further embodiment, other mechanisms for releasably retaining legs 118, 118', 118" can be used, such as a mechanical lock, or a "snap fit" (as shown in FIGS. 16A and 16B). A snap fit may be an interference fit implemented, for example, by the tightness of the fit between base 110 and legs 118, 118', 118" by using a resilient material, such as plastic, rubber, elastomer, or other material that allows a slight flexure of base 110 or legs 118, 118', and 118" when legs 118, 118', and 118" are pressed into base 110. For example, base 110 can comprise a plurality of protrusions 1601, and legs 118, 118', and 118" can comprise a plurality of grooves 1602 (or vice versa). When legs 118, 118', and 118" are arranged in the retracted configuration (as shown in FIGS. 16A and 16B), protrusion 1601 engages groove 1602. By interlocking protrusions 1601 with grooves 1602, legs 118, 118', and 118" can be securely retained within base 110 by the interference fit between protrusion 1601 and groove 1602.

Figure 4:
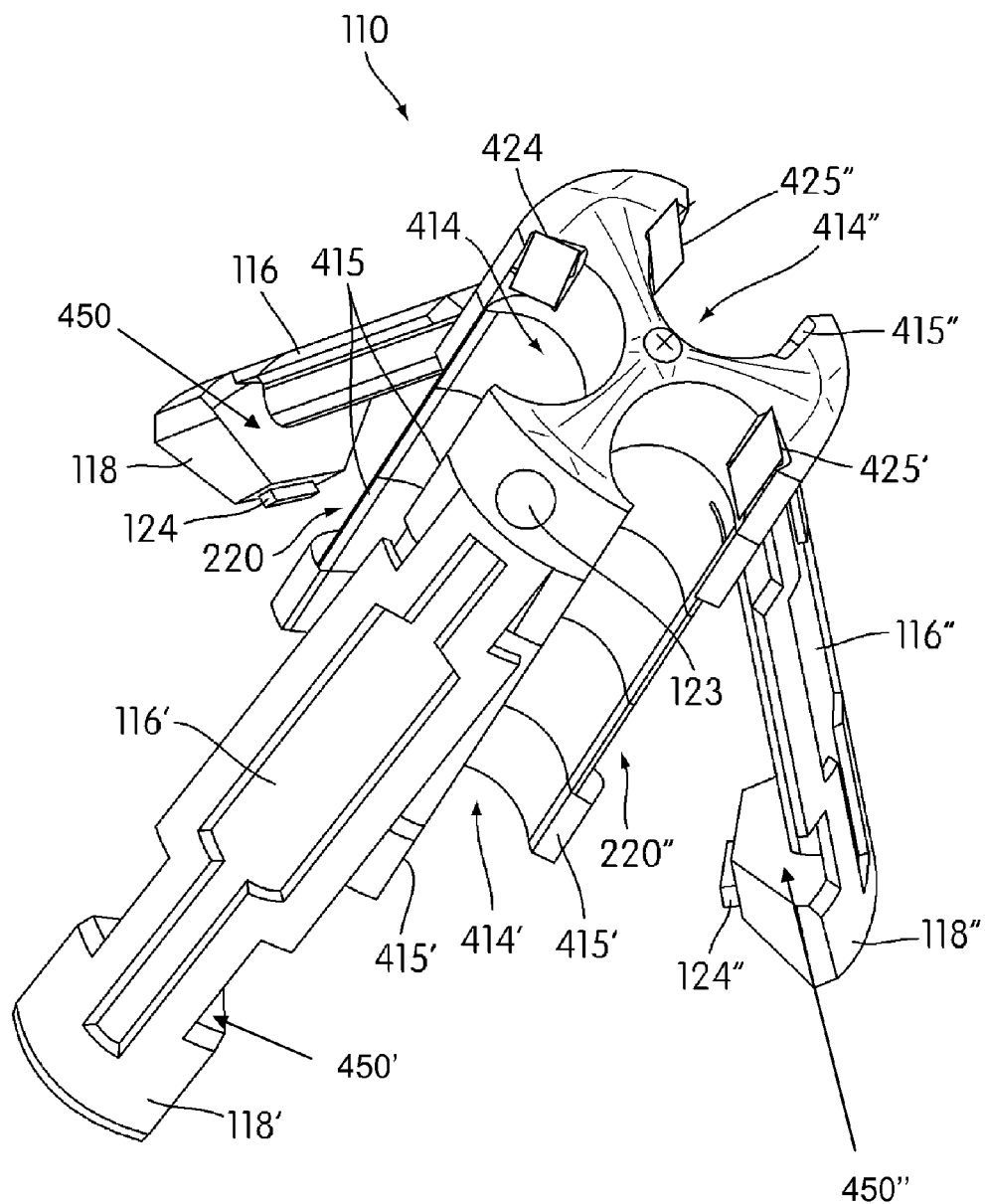
FIG. 4 shows an example of a base with all of the independent light sources removed and the base expanded according to an embodiment.

Additionally, an interference fit may be implemented, for example, between leg portion 1610 and recess 221. In particular, the width of recess 221 can be configured to be slightly smaller than the width of leg portion 1610. When leg 118, for example, is retracted into base 110, leg portion 1610 may flex creating pressure and friction between the surfaces of leg portion 1610 and recess 221 adequate to retain leg 118. An interference fit can also be provided between base 110 and legs 118, 118', and 118'' at shoulders 450, 450', and 450'' of legs 118, 118', and 118'', respectively (as shown in FIG. 4). For example, legs 118, 118', and 118'' can be configured to flex creating pressure and friction between the surface of shoulders 450, 450', and 450'' and the bottom of base 110.

Figure 3A:
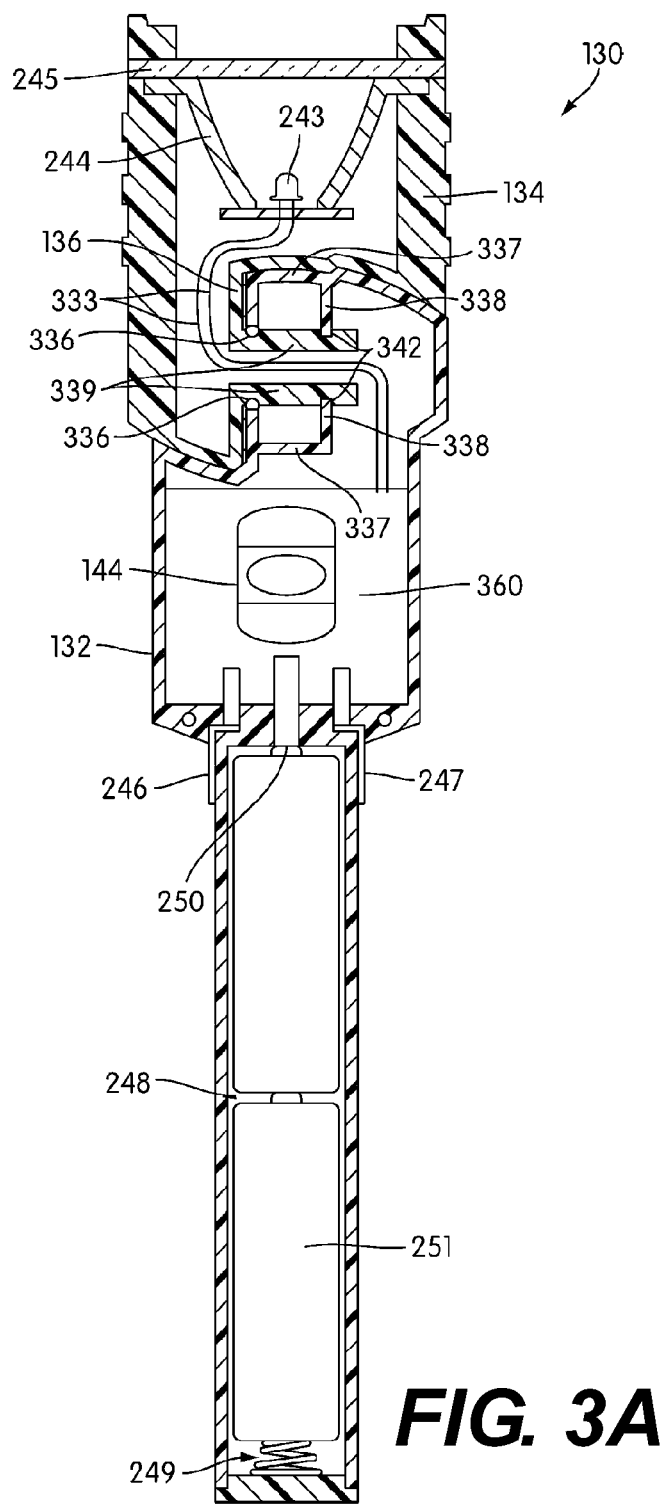
FIG. 3A shows a cross section of an independent light source detached from the base according to an embodiment.

FIG. 3A is a cross sectional view of a single light source 130 detached from base 110. In an embodiment, body 132 of light source 130 may be configured to have a shape or region which corresponds to a receiving region or bay provided in base 110 such that light source 130 may be securely retained in base 110. For example, light source 130 may have a body 132 having a cylindrical portion that is configured to be inserted into a cylindrical space or receiving region, such as light source receiving bays 414, 414', 414'' in base 110 (see FIG. 4). Body 132 may be configured to have a size and shape enabling light source 130 to be comfortably held in a person's hand when light source 130 is detached from base 110, and may be provided with a textured non-slip soft rubber or elastomeric handgrip 142, for example.

Light source body 132 may further include a power source compartment 248 configured to contain a power source 251 (e.g., one or more conventional batteries, rechargeable batteries, and/or capacitors) for providing power to the illumination element 243 located in head 134. The power source 251 may be electrically coupled to the illumination element 243, for example, via a spring electrical contact 249, an electrical contact 250, and conductors 333, e.g., wires or conductive ribbon. The spring electrical contact 249 may be configured to be spring biased against, for example, a battery terminal of power source 251, in order to maintain electrical contact. Light emitted by illumination element 243 may be reflected off reflector 244 and directed through window or lens 245 in the direction of the axis of illumination. Head 134 may be configured to rotate about pivot 136 in order to change the direction of illumination. For example, head 134 may be rotated downward about a pivot axis (e.g., at a 45 degree angle) to better illuminate the ground in front of an individual's footsteps when the body 132 of light source 130 is held horizontally during walking, or head 134 may be rotated to form a right angle with respect to body 132.

Light source 130 may be actuated by ON/OFF switch 144 when light source 130 is detached from base 110. Light source 130 may also be configured when installed in base 110 to operate in synchronism with other light sources 130 installed in base 110. Electrical contacts 246 and 247 may be provided on light source 130 and configured to electrically couple base 110 with light source 130. One or more signals may be sent and/or received between each light source 130 via base 110 for indicating and/or controlling whether each light source 130 is ON or OFF. In particular, power control circuit 700 or electrical circuit 360 (see FIGS. 7A and 7B, described in more detail below) may be provided in each light source 130 so as to detect an illumination state of the other light sources 130', 130'' installed in base 110 via the "TO TRIPOD COMMON" connection between light sources 130, 130', 130'' when installed in base 110. Control circuit 700 may be configured to provide common control of the illumination states of light sources 130, 130', 130'', for example. In one embodiment, light sources 130, 130', and 130'' can be connected between terminals "+LED" and "−LED", where "−LED" may be configured as a common ground (see FIG. 7B) to provide electrical power to each light source 130, 130', and 130'' when light source 130, 130', or 130'' has been turned ON. In an embodiment, any light source 130, 130', or 130'' having dead or no batteries will not illuminate when turned ON by respective ON/OFF switches 144, 144', 144''. Nevertheless, ON/OFF switches 144, 144', 144'' may still operate all other light sources 130, 130', or 130'' having sufficient power which are also installed in base 110 via the "TO TRIPOD COMMON" connection.

Figure 3B:
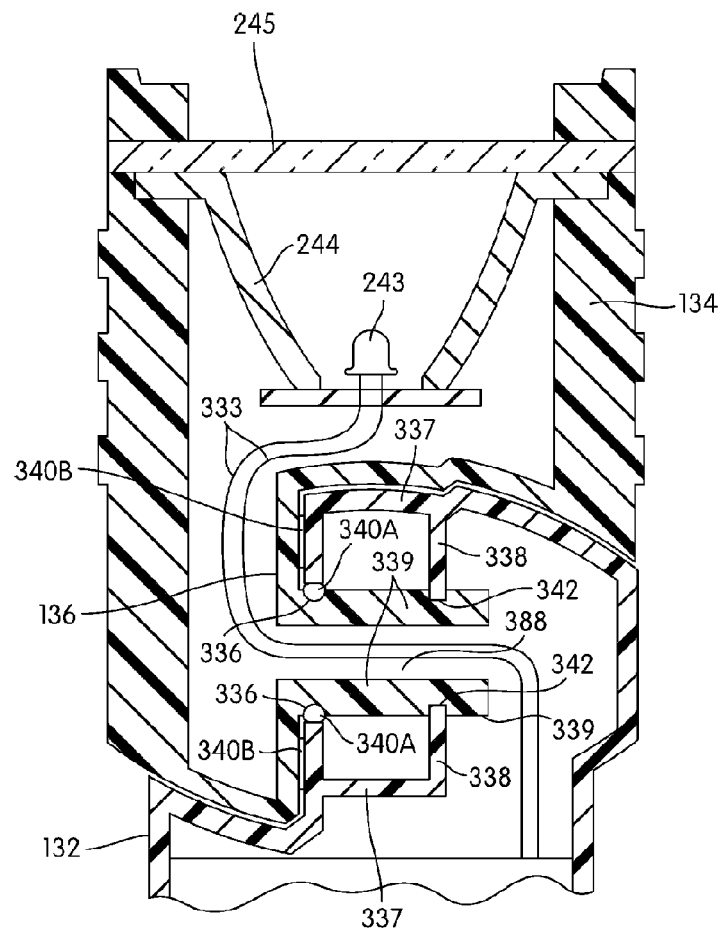
FIG. 3B shows a cross section of a pivot provided between the body and the head of a light source enabling the light source head to be adjusted to different angles with respect to a longitudinal axis of the light source and the illumination device.

FIG. 3B shows pivot 136 in more detail. Pivot 136 may include, for example, pivot race 337 having a cylindrical void 388 for receiving pivot pin 136, which may have a substantially coextensive generally cylindrical outer surface 389. Pivot pin 339 may be configured to extend into pivot race 337 and to allow relative rotational moment between pivot pin 339 and pivot race 337. Pivot race 337 can be configured to retain pivot pin 339. For example, pivot race 337 may include an extended portion 338 configured to interconnect with groove 342 disposed in the outer surface of pivot pin 339. In this configuration, lateral movement (i.e., left or right in FIG. 3B) tending to pull pivot pin 339 out of pivot race 337 is minimized or prevented. Accordingly, pivot pin 339 is securely retained within pivot race 337 and head 134 may rotate relative to body 132 about pivot pin 339.

In one embodiment, a frictional engagement is provided within pivot 136 to maintain a desired angle between head 134 and body 132. For example, O-ring 340A may be disposed within annular groove 336 and configured such that pivot pin 339 extends through O-Ring 340A. O-Ring 340A may be configured to be thicker than the space between the shank of pivot pin 339 and pivot race 337. As a result, O-Ring 340A may be compressed, thus providing an interference fit and frictional engagement between pivot pin 339 and pivot race 337, partially resisting or damping the rotation of head 134 about pivot pin 339. It is also envisioned that multiple O-Rings, or a sheath of frictional material resembling a bushing, may be provided to increase, for example, the degree of resistance to rotation or the durability of the frictional engagement. Alternatively, or in addition to O-Ring 340A, a frictional washer 340B may be provided having a thickness greater than the space between head 134 and pivot race 337, thus providing an interference fit and frictional engagement between head 134 and pinot race 337.

In one embodiment, pivot pin 339 may be configured as a hollow conduit connecting the interior spaces of body 132 and head 134. Wires 333, for example, may be run through pivot pin 339 which are configured to carry power to the one or more illumination element 243 located in head 134 from power source 251 located in body 132. As a result, wires 333 are protected from the outside environment because they remain inside light source 130, and stresses applied to wires 333 (i.e. fatigue) are minimized.

FIG. 4 shows base 110 with all light sources 130 removed. As shown, base 110 may be configured to include a plurality of bays 414, 414', 414'' for receiving light sources 130, 130', 130'', respectively. In addition, each bay (e.g., bay 414) may be configured to include a plurality of electrical contacts (e.g., contacts 424 and 425) for electrically connecting base 110 and the light sources 130, 130', 130'' which are installed in base 110. Electrical contacts 424, 424', 424'' and electrical contacts 425, 425', 425'' in bays 414, 414', 414'' may include a conductive material such as metal, and may be spring-biased in order to maintain a secure "snap fit" mechanical and electrical connection with electrical contacts 246 and 247 provided on each of the light sources 130, 130', 130''. This secure mechanical and electrical connection may be used to releasably retain the lights in the base. Alternatively, or in conjunction with the secure mechanical and electrical connection between electrical the electrical contacts, bays 414 may be also configured to securely retain light sources 130 when installed in base 110, for example, by a "snap fit"

between bay 414 and body 132. The "snap fit" may be implemented, for example, by the tightness of the fit between bay 414 and body 132 by using a resilient material, such as plastic, rubber, elastomer, or other material that allows a slight flexure of the open edges 415 of bay 414 when body 132 is pressed into bay 414.

Figure 5:
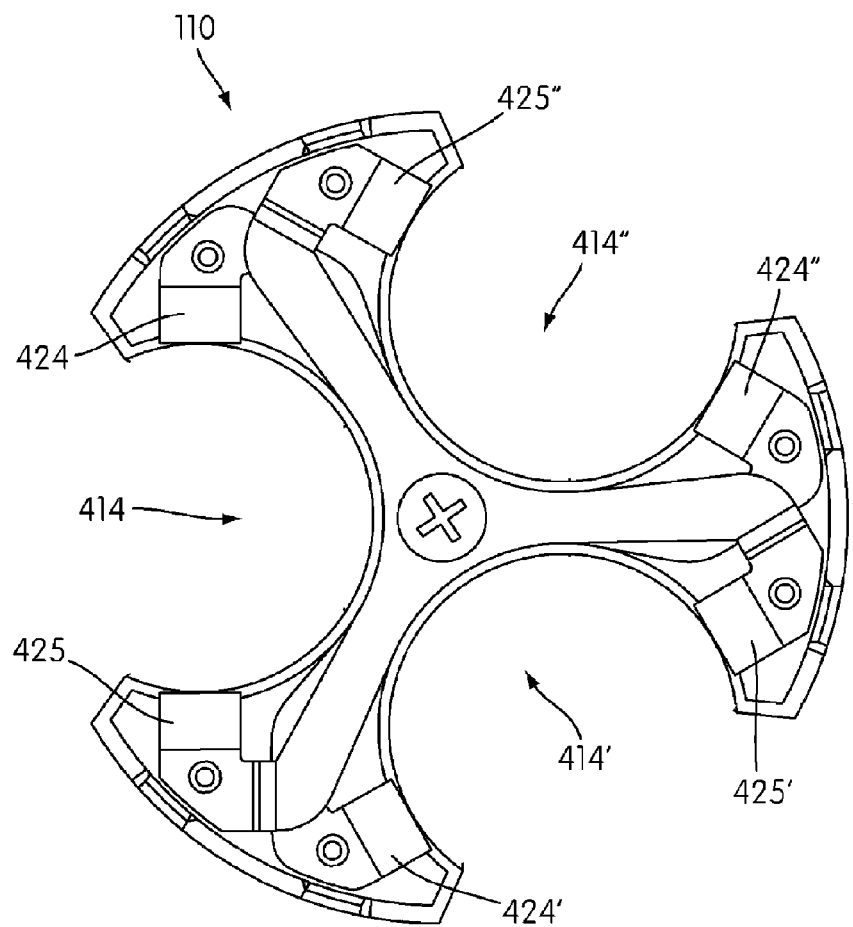
FIG. 5 shows an example of electrical contacts in the base in a cut-away top plan view according to an embodiment.

FIG. 5 shows electrical contacts 424, 424', 424" and 425, 425', 425" in a cutaway top view of base 110. The electrical contacts connect each of the light sources 130, 130' and/or 130" that are installed in the base with the base 110. For example, when light source 130 is installed in base 110, common electrical connections may be provided with the other light sources 130' and 130", depending on which are installed. That is, for example, electrical contacts 424 and 425 may be electrically connected to electrical contacts 246 and 247 on light source 130. Thus, when each light source 130, 130' 130" is installed in base 110, electrical contacts 424, 424', 424" are electrically connected in common and electrically insulated in a known manner from contacts 425, 425', 425" (which may also be electrically connected in common).

Figure 6:
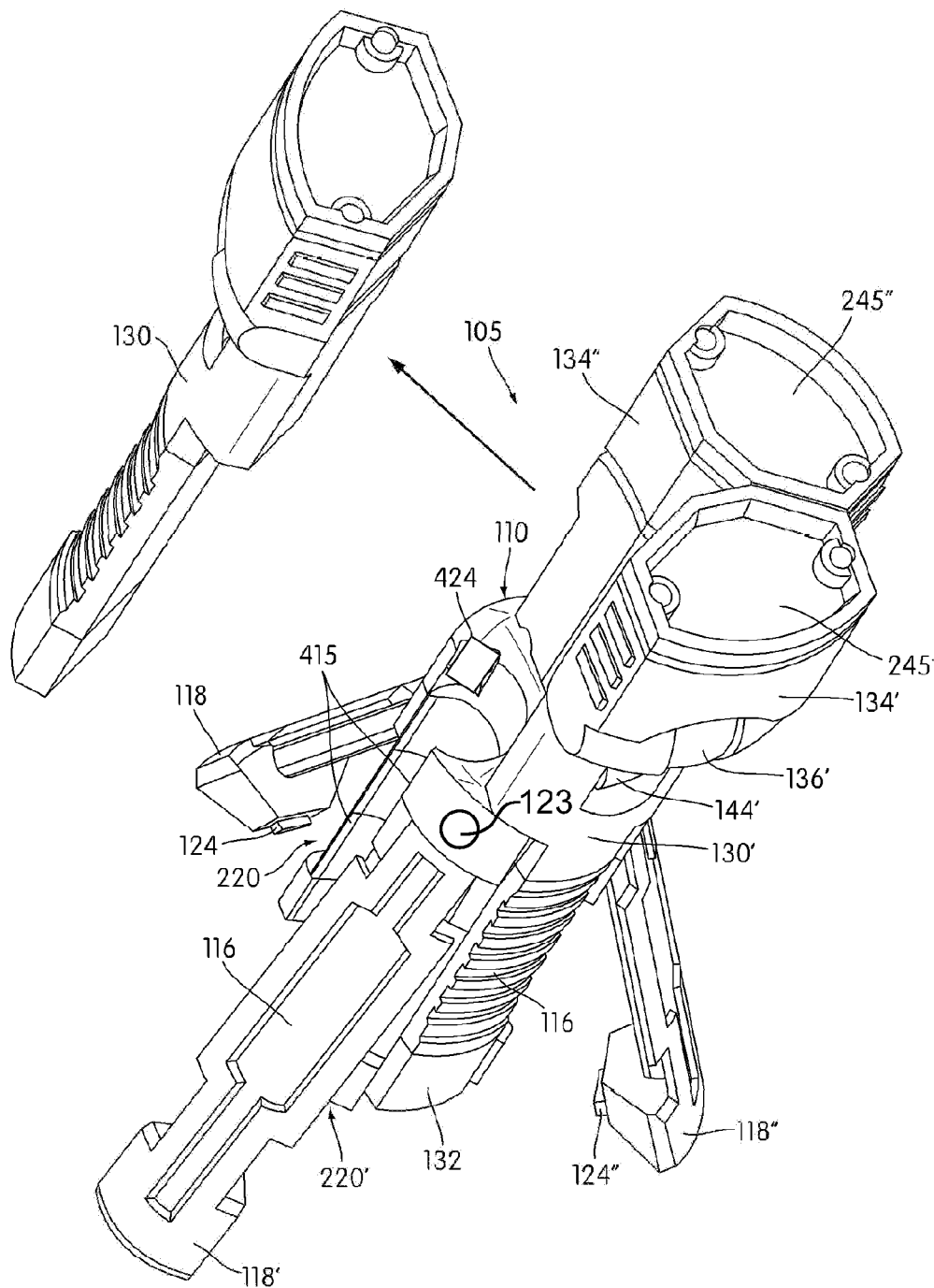
FIG. 6 shows an example of a base with one independent light source detached from the base, and the base expanded in a tripod configuration according to an aspect of an embodiment.
Figure 14:
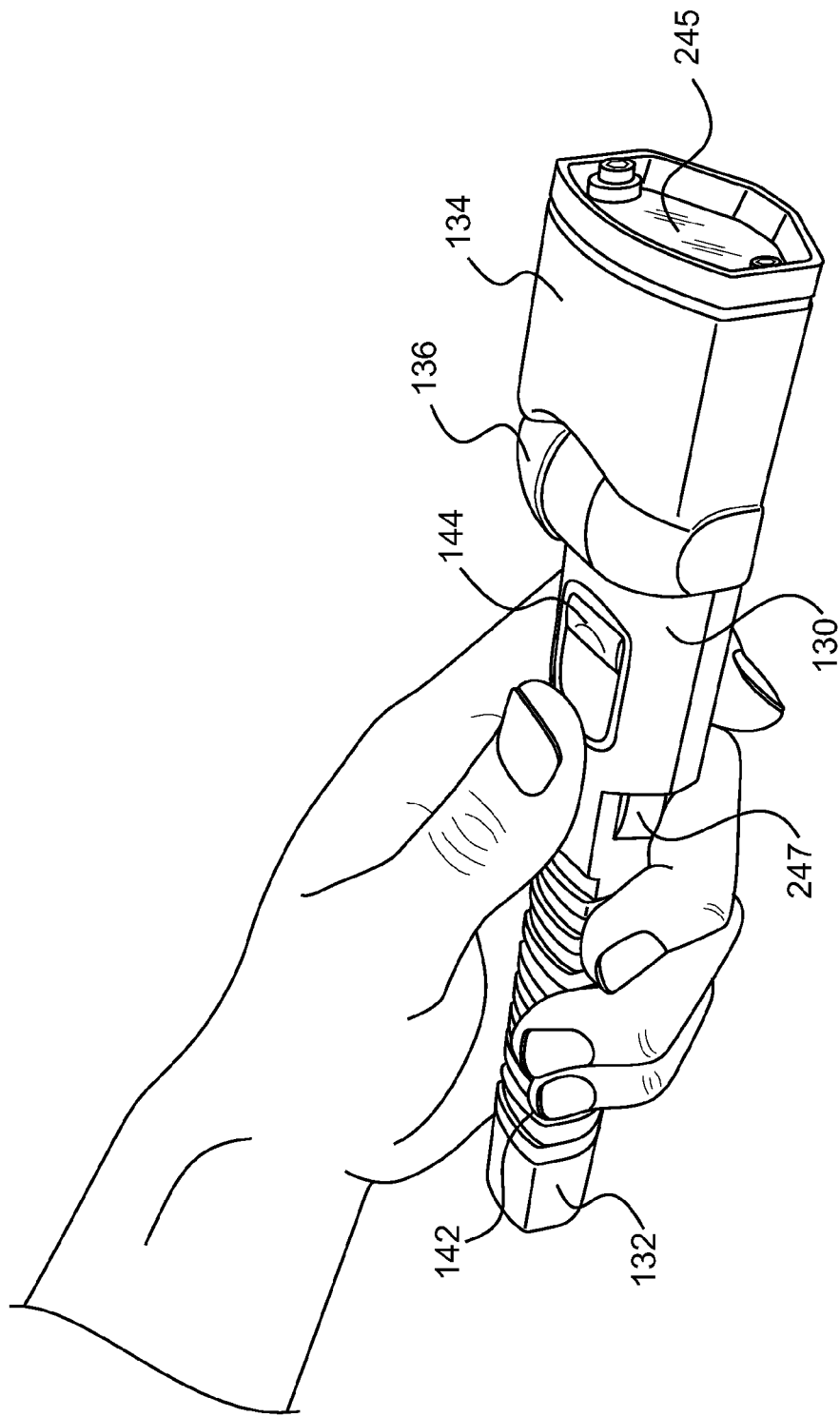
FIG. 14 shows an embodiment of an individual light source arranged in a handheld flashlight configuration.

FIG. 6 shows base 110 with a single light source 130 removed from base 110. In this configuration, the detached light source 130 may be operated independently, e.g., as a separate handheld flashlight (as shown in FIG. 14). In addition, the two light sources 130', 130" installed in base 110 may operate as a work light, for example, and may further be synchronized to turn ON or OFF according to operation of ON/OFF switch 144', 144" of either light source 130', 130".

Light source 130 (and also, 130' and 130") can be configured to be coupled to base 110 by sliding, in the direction of the longitudinal axis of illumination device 105, body 132 into bay 414. Furthermore, an interference fit can be formed between bodies 132, 132', and 132", and bays 414', 414', and 414", respectively, to retain light sources 130, 130', and 130" in bays 414, 414', and 414". In an embodiment, for example, an interference fit can be formed by the engagement of electrical contacts 246 and 247 with electrical contacts 424 and 425.

Figure 7A:
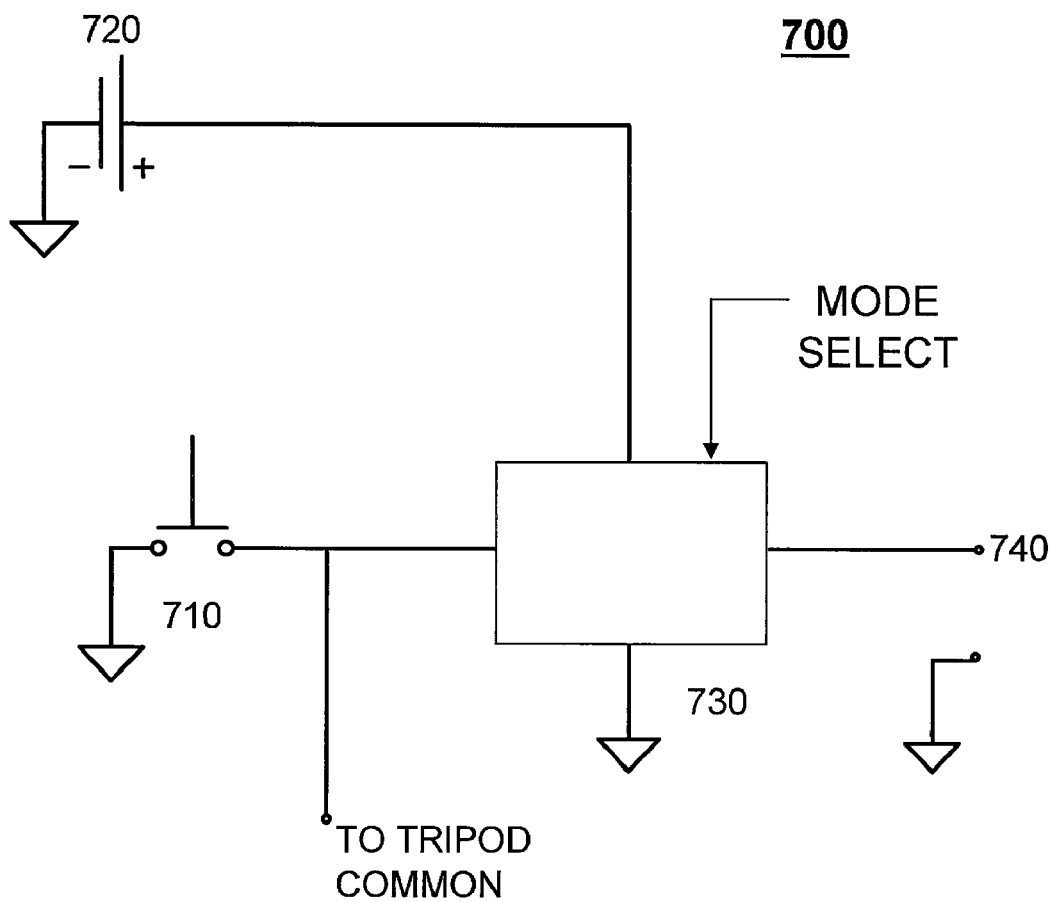
FIG. 7A provides a block diagram of a power control circuit according to an embodiment.

FIG. 7A provides a block diagram depiction of an embodiment of a power control circuit. Power control circuit 700 includes switch 710, which may be a momentary push-button "ON/OFF" switch connected between a common node (e.g., ground) and controller 730. Controller 730 may include various passive electrical components (e.g., resistors, capacitors, inductors, and diodes) arranged in a known manner, and may also include a control chip, e.g., a microcontroller. Power source 720 is connected to controller 730 and, although depicted as a battery, power source 720 may include, in various aspects of an embodiment, conventional batteries, rechargeable batteries, and/or other power storage elements, e.g., capacitors. Under control of controller 730, output terminal 740 provides electrical power to a lighting element, e.g., one or more LEDs or incandescent bulb(s) in light source 130.

Figure 7B:
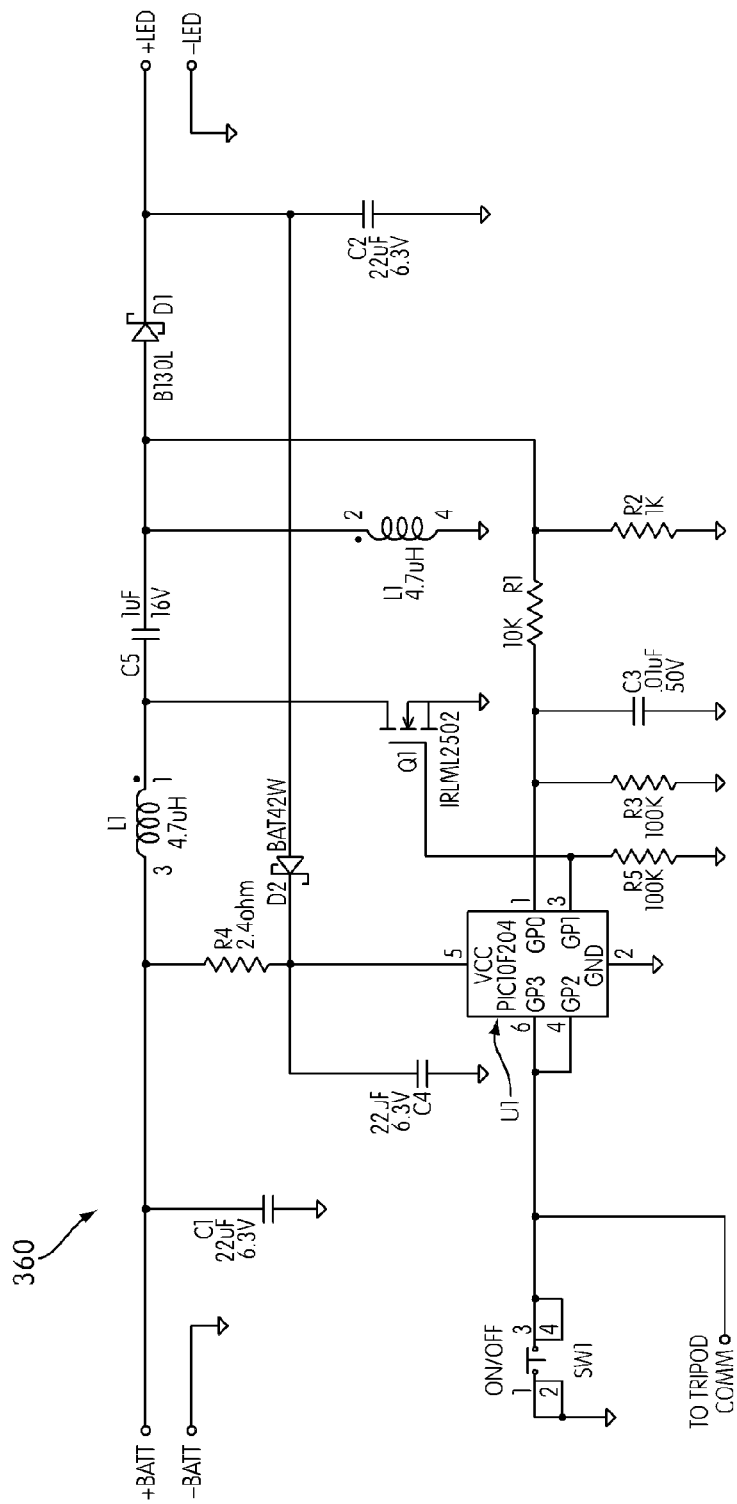
FIG. 7B shows a schematic of one possible implementation of the power control circuit of FIG. 7A implemented as an electrical circuit according to an aspect of an embodiment.

FIG. 7B shows an exemplary embodiment of power control circuit 700 in which electrical circuit 360 controls an individual light source 130 (at "+LED" and "−LED" terminals), both when the individual light source 130 is installed in base 110, as well as when light source 130 is removed from base 110. A control circuit such as circuit 360 may be provided in each of the detachable light sources 130, 130', 130". A source of electrical power may be provided to electrical circuit 360 in each of detachable light sources 130, 130', 130" by connecting the terminals of power source 251 to the "+BATT" and "−BATT" terminals of a respective circuit 360, and which may connect to a source of power, e.g., one or more batteries. Power may be selectively provided to the "+LED" and "−LED" terminals of illumination element 243 under the control of microcontroller U1 (e.g., a PIC10F204 microcontroller).

Circuit 360 in FIG. 7B is known as a single ended primary inductor converter (SEPIC) circuit that operates as a DC-DC converter which provides a non-inverted output (positive voltage) that may be greater than, less than, or equal to the input voltage. As with other switched mode power supplies, the SEPIC exchanges energy between the capacitors and inductors in order to change energy from one voltage to another. The amount of energy exchanged is controlled by transistor Q1, which is typically a MOSFET. MOSFETs are used instead of bipolar devices (i.e., BJTs) due to the extremely high input impedance and the low voltage drop across the MOSFET when turned on. The output voltage of the SEPIC is controlled by the duty cycle of the control transistor Q1 which is, in turn, controlled by microcontroller U1, e.g., a PIC10F204 8-bit flash microcontroller sold by Microchip, Inc. The PIC10F family of microcontrollers may be selectively programmed to provide desired responses and performance characteristics as would be known to a person of ordinary skill in the art.

One advantage of a SEPIC over the other DC-DC converter types is that SEPICs are useful in applications where the battery voltage can be either above or below the desired regulated output voltage. For example, a single lithium ion battery typically has an output voltage ranging from 4.2 volts to 3 volts, depending on age and environment, among other factors. If the accompanying device requires 3.3 V, then the SEPIC would be effective since the battery voltage can be both above and below the regulator output voltage. Other advantages of SEPICs are input/output isolation provided by capacitor C5, and a true shutdown mode, i.e., when transistor Q1 is turned off, the output drops to 0 V.

In a SEPIC operating in steady-state, the average of the voltage across capacitor C5 is the applied voltage "BATT". Since C5 blocks DC current, the average of the current in C5 is zero. Therefore, the only source of the average load current is the current in the second section of inductor L1, i.e., the current from terminals 2-4 ("IL2"). Therefore, the average current IL2 is the same as the average load current, and is independent of the input voltage "+BATT".

Capacitor C1 may be used to reduce the effects of the parasitic inductance and internal resistance of the power supply. The boost/buck capabilities of the SEPIC are possible because of capacitor C5 and the second section of inductor L1 (terminals 2-4). The first section of inductor L1 (terminals 3-1) and transistor Q1 create a standard boost converter, which generate a voltage ($V_{Q1}$) that is higher than "BATT", and whose magnitude is determined by the duty cycle of transistor Q1. Since the average voltage across C5 is "BATT", the output voltage at "+LED" is ($V_{Q1}$−BATT). If $V_{Q1}$ is less than twice "BATT", then the output voltage at "+LED" will be less than the input voltage. If $V_{Q1}$ is greater than twice "BATT", then the output voltage at "+LED" will be greater than "BATT".

Since the average voltage of capacitor C5 ("VC5") is equal to "BATT", the voltage across the first section of inductor L1 ("VL1") is the negative of the voltage across the second section of inductor L1 ("VL2"). For this reason, the two inductors can be wound on the same core. Since the voltages VL1 and VL2 are the same in magnitude, their effects on the mutual inductance will be zero, assuming the polarity of the windings 3-1 and 2-4 is correct. Also, since the voltages VL1 and VL2 are the same in magnitude, the ripple currents from the two inductors will be equal in magnitude.

When switch SW1 (corresponding in one embodiment to ON/OFF Switch 144) is first activated, microcontroller U1 may be configured to turn Q1 "ON", thus increasing the current in the first section of inductor L1 (terminals 3-1) (IL1), and the current in the second section of L1 (terminals 2-4) (IL2) decreases (becomes more negative). The energy to increase the current IL1 comes from the input source "BATT". Since Q1 is a short while closed, and since the instantaneous voltage across capacitor C5 (VC5) is approximately "+BATT", the voltage VL2 is approximately "−BATT". Therefore, capacitor C5 supplies the energy to decrease (make more negative) the current IL2. The duty cycle of transistor Q1 can be controlled by microcontroller U1 to maintain the desired output voltage at the "+LED" terminal when the input voltage source ("+BATT") is either higher than or less than the desired output voltage.

When transistor Q1 is turned off for a sufficient period of time, the current IL1 becomes the same as the current in capacitor C5 (IC5), and the output voltage at "+LED" can be caused to go to zero Volts, and the light source 130 will be turned "OFF".

Microcontroller U1 is connected to ON/OFF switch SW1 (e.g., ON/OFF switch 144) at two terminals (e.g., GP2 and GP3), and may be pre-programmed by an operator to respond in various ways to a series of momentary depressions of SW1, as would be known to a person with skill in the art. For example, a first depression of SW1 could be configured to cause the output at "+LED" terminal to go the desired voltage level (either higher or lower than "+BATT" by controlling the duty cycle of Q1 by microcontroller U1. A subsequent depression of SW1 could be configured within microcontroller U1 to cause the output voltage at "+LED" to go to zero, thus turning off detachable light source 130. In one or more embodiments, each light source 130, 130', 130" may include an associated electrical circuit 360 through which the respective light source 130, 130', and 130" may be controlled. Each of the circuits 360, 360', and 360" may be essentially identical in one or more embodiments.

When light sources 130, 130', and 130" are arranged in base 110, a depression of any one of the ON/OFF switches 144, 144', 144" (each corresponding to an associated switch SW1 in an associated circuit 360) may cause the light sources to change state, from either "ON" to "OFF" through the electrical connection between each light source 130 and the "TO TRIPOD COMMON" (or "TO TRIPOD COMM") connection which may be applied to pins GP2 and GP3 of each microcontroller U1. Although switch SW1 has been described as a momentary push button switch, it may be more generally considered to be any switch that is in a normally open position. Accordingly, when switch SW1 is activated, pins 4 and 6 of microcontroller U1 ("GP2" and "GP3") may be connected to the ground potential, and the ON/OFF state of the illumination element 243 may be changed through the operation of circuit 360 described above. When switch SW1 is subsequently re-activated, the ON/OFF may be changed again in accordance with the programming of microcontroller U1.

As mentioned above in one embodiment, when light source 130 is installed in base 110, it may be operably connected to the other light sources installed in base 110 by terminal "TO TRIPOD COMM," i.e., via electrical contact 246. As a result, for example, the installed light sources 130, 130' and/or 130" may be synchronized to turn ON and turn OFF substantially simultaneously. For example, if the three illustrated light sources 130, 130' and 130" are installed in base 110 are OFF, and switch SW1 (e.g., switch 144) is operated for any one of the installed light sources, a signal is communicated to all of the installed light sources via the "TO TRIPOD COMM" connection (e.g., electrical contact 246 being temporarily set to ground potential) to turn ON or turn OFF all of the installed light sources 130, 130', 130". A common ground connection in FIG. 7 may be used throughout the device, as appropriate, and as would be appreciated by a person of ordinary skill in the art, e.g., electrical contacts 247, 247', 247".

In one embodiment, if two light sources installed in the base are OFF and a third light source 130 which is ON is installed in the base 110, all of the installed light sources 130 may be configured to automatically turn ON via the "TO TRIPOD COMM" connection (e.g., electrical contact 246), depending on the preprogrammed functionality implemented in microcontroller U1. Furthermore, when one or more of the light sources installed in the base 110 are ON, a light source 130 that is subsequently installed in the base 110 or removed from the base 110 may be configured to automatically turn ON or remain ON, also depending on the programmed configuration of microcontroller U1. Microcontroller U1 may be used in configuring illumination device 105 for such automatic operation, or for different ON/OFF characteristics.

In an alternative embodiment, the number of light sources that are activated may be controlled via microcontroller U1 to depend upon the number of times a switch is depressed on one of the light sources 130, similar to the approach used in commonly-owned U.S. Pat. No. 7,342,360, previously incorporated by reference. Further, as noted above, light source 130 may include a plurality of lights 243 in a single illumination head 134. In yet another alternative embodiment, the "TO TRIPOD COMM" connection between light sources 130 may be configured so as to be switchably disconnected such that light sources 130 operate independently from each other, even when coupled to base 110.

Although a particular electrical circuit 360 with microcontroller U1 has been described for detecting and controlling the illumination state of a light source 130, it should be recognized that other electrical circuits may be provided for detecting and controlling light sources 130 as described herein. For example, the circuit components that perform the detecting and controlling functions may be located in base 110 in a distributed configuration. Furthermore, the electrical circuit disclosed in commonly owned U.S. Pat. No. 7,342,360 may also be adapted for use in various embodiments of this disclosure.

Figure 8:
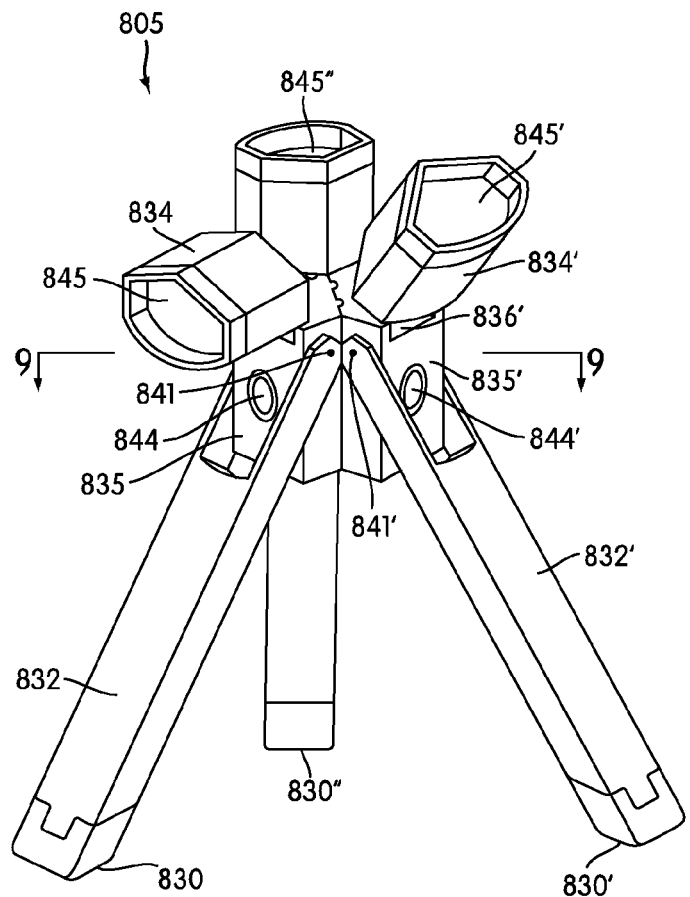
FIG. 8 shows an embodiment of an illumination device in which each independent light source has a neck portion configurable to attach a plurality of independent light sources to one another, and a pivotable body configured to expand into a tripod configuration.
Figure 9:
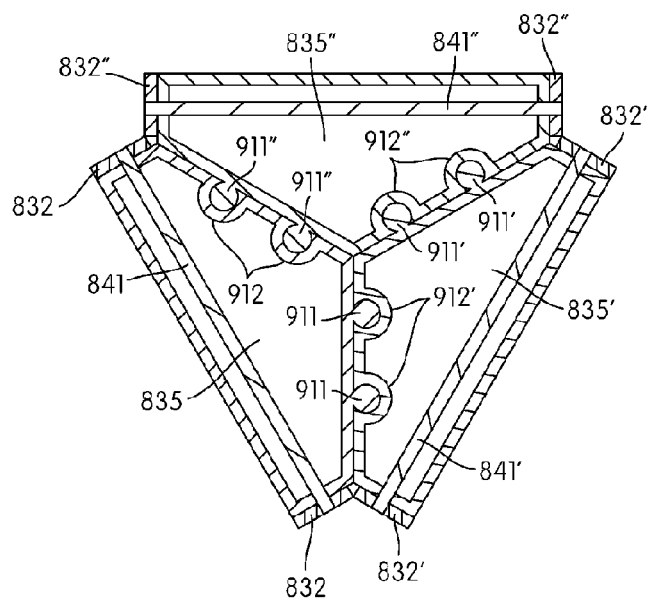
FIG. 9 shows an embodiment of an exemplary connection between neck portions of the independent light sources of FIG. 8.

FIG. 8 shows an alternate embodiment of an illumination device 805 configured as a free standing work light, and which is similar in some aspects to embodiments described with respect to FIGS. 1-7. For example, illumination device 805 may include multiple independent light sources 830, 830', 830" having heads 834, 834', 834", respectively. Each head 834, 834', 834" may be pivotally connected to neck portions 835, 835', 835" by pivots or hinges 836, 836', 836", respectively. Heads 834, 834', 834" may each be configured to provide illumination along respective axis of illumination. The respective axis of illumination may be capable of being oriented to be parallel, or at an angle (acute, right, or obtuse), with respect to the longitudinal axis of illumination device 805 by pivoting heads 834, 834', 834". In an embodiment, neck portions 835, 835', 835" are connected to one another, for example, as shown in FIG. 9. Furthermore, neck portion 835, 835', 835" may also be separately pivotably connected to light source bodies 832, 832', 832" by hinges 841, 841', 841", respectively. Pivotable light source bodies or legs 832, 832', and 832" may be moved to the deployed or open position by a spring assembly or, in a variant of this embodiment, they may be manually deployed. In addition, a frictional arrangement at a pivoting leg hinge may be used to lock the legs in the deployed positions if desired.

Each pivotable light source body 832, 832', 832" may be movable between a non-expanded configuration (e.g., similar to FIG. 1) in which light source bodies 832, 832', 832" are collapsed inward, thereby causing light source bodies 832, 832', 832" to be substantially parallel with the longitudinal axis of illumination device 805. In the non-expanded configuration, for example, illumination device 805 may be used in a similar manner to a handheld flashlight. In addition, illumination device 805 may be arranged in an expanded configuration (as depicted in FIG. 8) in which pivotable light source bodies 832, 832', 832" are pivoted outward from the longitudinal axis of illumination device 805 at various angles. In the expanded configuration, light source bodies 832, 832', 832" (i.e., the handle portions or "leg" portions) form a stable platform for supporting light sources 830, 830', 830" in a substantially vertical or upright position (e.g., for use as a free standing work light).

In an embodiment in which illumination device 805 is configured with three light sources 830, 830', 830", the light source bodies 832, 832', 832" may form a tripod for supporting light sources 830, 830', 830". However, it is recognized that a greater or a fewer number of light sources 830 may be provided. For example, the number of support legs can be increased by providing additional light sources 830. Furthermore, for example, a configuration having two light sources 830 may be provided in which the distal ends of the light source bodies 832 (i.e., the "feet") are configured to be sufficiently wide for supporting illumination device 805 in an upright orientation. It is recognized that if multiple light sources 830 are connected to one another by releaseably connected neck portions 835, 835', 835", it may be possible to separate one or more light sources 830 from the group of connected light sources 830, thereby enabling illumination device 805 to provide a plurality of independent and separate sources of light. In such case, the power source (e.g., battery) can be disposed within the bodies 832, 832', 832", which function as legs.

In a related aspect of the embodiment of FIG. 8, for example, when light source 830 is not connected to another light source (e.g., light source 830', 830"), switch 844 can be configured to turn ON and to turn OFF light source 830, as discussed above with respect to the electrical circuit of FIGS. 7A and 7B. Furthermore, when the light source 830 is connected to at least one other light source (e.g., light sources 830' and/or 830"), any one of the switches 844, 844', 844" of the connected light sources may be configured to control the application of power to all of the light sources.

FIG. 9 shows an embodiment of how neck portions 835, 835', 835" can be configured. In various embodiments, neck portions 835, 835', 835" may be configured to enable light sources 830, 830', 830" to be releasably connected to one another, for example, by a "snap fit," magnetic force, hook and loop fastener, or any conventional method of connection. FIG. 9 shows an example configuration of a "snap fit" connection between surfaces of adjoining neck portions 835, 835', 835". Each neck portion 835, 835', 835" may be provided with a tongue portion 911, 911', 911", and a groove portion 912, 912', 912", respectively. The groove portion 912, 912', 912" may be configured to receive and interlock with tongue portions 911", 911, 911', respectively. Neck portions 835, 835', 835" may include a resilient material such as plastic, rubber, elastomer, or other material that allows a slight flexure of the tongue portions 911, 911', 911" and/or groove portions 912, 912', 912" when neck portions 835, 835', 835" are pressed together. In addition, or alternatively, neck portions 835, 835', 835" may be connected by sliding, in the direction of the longitudinal axis of illumination device 805, tongue portions 911, 911', 911" into groove portions 912", 912, 912', respectively. Neck portions 835, 835', 835" may also be connected, for example, by providing magnetic materials (e.g., a pair of magnets having opposite polarities, or a ferromagnetic metal and a magnet) or hook and loop fasteners on opposing surfaces of adjoining neck portions 835, 835', 835". The metal contacts between adjacent light sources 830, 830' and 830" may, in one embodiments be provided within the tongue and groove portions to provide the electrical communication between light sources as previously described.

In this embodiment, the circuit 360 may be provided in one of the light sources 830, 830' or 830" that serves as a "base" flashlight. In such embodiment, light source 830 would be one of the multiplicity of flashlights that are connected to achieve the function of FIGS. 7A and 7B. It should be appreciated that while the invention has been disclosed in relation to three light sources, fewer or more light sources may be provided and be within the scope of the invention.

In the context of the pivotable heads, in one embodiment it is contemplated that the light sources need not be separable from one another. In such embodiment, it is not necessary to provide separate battery compartments or separate switches. Rather, a single battery holder/compartment (or energy storage element) and/or a single switch can be optionally provided. In the case of a single switch, all illumination elements (e.g., LEDs or light bulbs) would be turned on or off together. If multiple switches are provided, the illumination element or elements in an individual head would be independently controlled by an independent switch.

In another embodiment, rather than providing legs 118, 118' and 118" as separate structures from the body or handle regions 132, 132', 132", such body or handle regions 132, 132', 132" can themselves be used as pivotal legs, in a manner similar to that disclosed by U.S. Pat. No. 7,342,360 (previously incorporated by reference in its entirety). However, in such an embodiment, base 110 would be of a shorter longitudinal length and devoid of legs 118, 118', 118". In addition, the handle region 132 would be capable of greater pivotal movement (greater degree of movement) to enable the handle regions 132, 132', 132", to function as tripod legs.

FIGS. 11 and 12 show an embodiment of base 110 spring-biased in an expanded configuration. FIG. 11 is drawn to illustrate an exemplary placement of springs 1101, 1101', 1101", e.g., coil springs, in base 110, which has been cutaway for clarity. Springs 1101, 1101', 1101" can be compressed between base 110 and legs 118, 118' and 118" in order to exert a force on legs 118, 118' and 118" which biases legs 118, 118' and 118" away from base 110. While particular embodiments of the inventive concept have been described, it is understood that modifications will be apparent to those skilled in the art without departing from the spirit of the inventive concept. The scope of the inventive concept is not limited to the specific embodiments described herein. Other embodiments, uses, and advantages of the invention will be apparent to those skilled in art from the specification and the practice of the teachings of this disclosure.

What is claimed is:
1. An illumination device comprising:
   a plurality of independent light sources capable of being electrically coupled, each independent light source including:
   a body,
   a head having an illumination element,
   a power source holder configured to receive a power source for powering the illumination element,
   a switch configured to selectively apply power to the illumination element; and a base including a plurality of bays, wherein each bay is configured to receive one of the plurality of independent light sources,
wherein at least one of the switches is arranged so as to commonly control each of the plurality of independent light sources when the plurality of independent light sources are electrically coupled.

2. The illumination device of claim 1, wherein the coupled configuration comprises each of the plurality of independent light sources being arranged in fixed positions without physical contact with one another.

3. The illumination device of claim 2, wherein the base is interposed between the fixed positions and arranged to releasably hold each of the plurality of independent light sources.

4. The illumination device of, claim 1, wherein each independent light source is configured to be detachable from the base.

5. The illumination device of claim 1, wherein the head of each independent light source is configured to be continuously rotatatable between a first position in which the head is substantially inline with a longitudinal axis of the body of the light source and a second position in which the head is at an angle of 90° or more with respect to the longitudinal axis of the body of the light source.

6. The illumination device of claim 1, wherein the base further comprises a plurality of pivotable legs configured to extend from the base so as to support the base in a vertical orientation.

7. The illumination device of claim 6, wherein the pivotable legs are configured to pivotally extend from the base.

8. The illumination device of claim 1, wherein each independent light source further comprises an electrical circuit configured to be electrically connected with the switch and to detect respective ON/OFF states of the independent light sources.

9. The illumination device of claim 8, wherein the electrical circuit is further configured to control an ON/OFF state of an independent light source installed in the base.

10. The illumination device of claim 3, wherein the independent light source is either placed in an ON state or remains in an ON state when installed in the base if another independent light source installed in the base is in the ON state.

11. The illumination device of claim 3, wherein any independent light sources installed in the base are either placed in an ON state or remain in an ON state when an independent light source that is installed in the base is in the ON state.

12. The illumination device of claim 3, wherein the base and each independent light source further comprise electrical contacts configured to electrically couple the base with at least one independent light source installed therein.

13. The illumination device of claim 1, wherein the illumination element comprises a light emitting diode (LED), an incandescent bulb, a florescent bulb, or combinations thereof 14. The illumination device of claim 3, wherein the base further comprises a handgrip portion.

15. The illumination device of claim 3, wherein the base is configured to communicate a signal between the base and at least one independent light source installed in the base, the signal indicating providing a command for controlling the illumination state of an installed light source.

16. An independent light source for an illumination device comprising:
a body;
a head having an illumination element;
a power source holder configured to receive a power source for powering the illumination element;
a switch configured to turn on and turn off the independent light source;
an electrical circuit configured to place the independent light source and at least one other independent light source in an electrically coupled state,
wherein the switch is configured to control an illumination state of both the independent light source and the at least one other independent light source when in the electrically coupled state; and
a coupling arrangement configured to selectively allow engagement with, or disconnection from, the at least one other independent light source,
wherein the head is configured to be rotatatable between angles at which the head is substantially inline with the body of the light source and angles at which the head is greater than 90° from being substantially inline with the body of the light source.

17. An independent light source for an illumination device, comprising:
a body;
a head having an illumination element;
a power source holder configured to receive a power source for powering the illumination element;
a switch configured to turn on and turn off the independent light source;
an electrical circuit configured to place the independent light source and at least one other independent light source in an electrically coupled state,
wherein the switch is configured to control an illumination state of both the independent light source and the at least one other independent light source when in the electrically coupled state; and
a coupling arrangement configured to selectively allow engagement with, or disconnection from, the at least one other independent light source, wherein the coupling arrangement includes a base.

18. The independent light source of claim 16, wherein the switch of the independent light source is configured to turn ON and to turn OFF the independent light source when the independent light source is disconnected from the at least one other independent light source.

19. The independent light source of claim 16, wherein, when in the electrically coupled state, the independent light source turns ON or remains ON when connected to the at least one other independent light source if the at least one other independent light source is ON.

20. The independent light source of claim 16, wherein, when in the electrically coupled state, the at least one other independent light source turns ON or remains ON when the independent light source is ON.

21. The independent light source of claim 16, wherein the illumination element includes a light emitting diode (LED), an incandescent bulb, a florescent bulb, or combinations thereof 22. The independent light source of claim 16, further comprising a handgrip portion.

23. An electrical circuit for an illumination device, the circuit comprising:
at least one electrical contact configured to electrically couple a plurality of independent light sources; and
a controller configured to detect and/or control an illumination state of at least one of the plurality of independent light sources;
wherein a plurality of coupled independent light sources are turned ON or turned OFF in synchronization with the turning ON or turning OFF, respectively, of one of the plurality of coupled independent light sources, wherein when one of a plurality of coupled independent light sources which are ON is decoupled, all of the independent light sources remain ON.

24. The electrical circuit of claim 23, wherein the controller is configured to control at least one independent light source to turn ON or remain ON when the plurality of independent light sources are coupled if at least one of the plurality of independent light sources which are coupled is ON.

25. An illumination device comprising:
a plurality of pivotable heads, wherein each pivotable head comprises an illumination element;
a plurality of pivotable legs, wherein each pivotable leg is movable between a handheld flashlight arrangement in which the legs are generally disposed adjacent one another along the length thereof to enable the legs to be grasped as a flashlight handle, and an expanded arrangement in which the pivotable legs extend away from one another to provide spaced support legs configured to support the plurality of pivotable heads in an upright position,
wherein each pivotable head is adjustable to different angles with respect to a longitudinal axis of the illumination device; and
a switch configured to control the application of power to at least one of the illumination elements.

26. The device of claim 25, further comprising a plurality of switches, wherein each of the plurality of switches is associated with a respective one of the plurality of illumination elements, and the application of power to all coupled illumination elements can be controlled by any one of the plurality of switches.

27. The device of claim 25, wherein each of the plurality of illumination elements form part of a respective independent light source, each light source including an associated power source holder.

28. The device of claim 27, further comprising a base that releasably couples the independent light sources to one another.

29. The device of claim 28, wherein the base comprises electrical contacts arranged to provide an interconnection between each of the plurality of light sources.

30. The device of claim 29, wherein the interconnection is configured to allow each of a plurality of switches associated with respective ones of the plurality of light sources to commonly control the application of power to all of the plurality of light sources.

31. The device of claim 29, wherein each light source has an on/off switch for controlling the associated light source if decoupled from the base.

32. The device of claim 25, further comprising an attachment interposed between, and releasably coupled to, the plurality of pivotable heads and the plurality of pivotable legs, wherein the attachment is configured to enable the plurality of pivotable heads to be coupled together.

33. The device of claim 25, wherein the plurality of illumination elements include three separate and independent light sources, and the pivotable legs are arranged in a tripod configuration when in the expanded arrangement.

34. The device of claim 33, further comprising at least one control circuit electrically coupled to the switch, wherein the control circuit is configured and arranged to control the application of power to each of the plurality of illumination elements when the plurality of pivotable heads are coupled together.

35. The device of claim 33, wherein each illumination element comprises a switch and control circuit configured to control the application of power to each illumination element.

36. The device of claim 30, wherein the pivotal legs are pivotally connected to the base.

37. The device of claim 25, wherein each pivotable leg comprises a spring configured to spring-bias the leg into the expanded arrangement.

38. The device of claim 25, further comprising a leg retainer configured to maintain the plurality of legs in the handheld flashlight arrangement.

39. The device of claim 38, wherein the leg retainer comprises a magnetic arrangement configured to releasably retain the plurality of legs by magnetic force.

40. The device of claim 39, wherein the leg retainer comprises a first magnetic material movably mounted with respect to a second magnetic material located on each of the plurality of legs.

41. The device of claim 28, wherein each leg is retained in the handheld flashlight arrangement by an interference fit between the leg and the base.

42. The device of claim 41, wherein the interference fit is formed between a groove on the leg and a protrusion on the base.

43. The device of claim 28, wherein each independent light source comprises a handle portion configured to be releasably coupled to the base by an interference fit.

44. The device of claim 42, wherein the base comprised a plurality of bays, and each handle portion is configured to be coupled to the base by slidably inserting the handle portion along a longitudinal axis of the illumination device into a bay. s.

* * * * *